United States Patent
Watano et al.

(10) Patent No.: US 10,840,507 B2
(45) Date of Patent: Nov. 17, 2020

(54) COMPOSITE POSITIVE ELECTRODE ACTIVE MATERIAL FOR ALL-SOLID-STATE SECONDARY BATTERY, METHOD FOR MANUFACTURING SAME, POSITIVE ELECTRODE, AND ALL-SOLID-STATE SECONDARY BATTERY

(71) Applicant: OSAKA PREFECTURE UNIVERSITY PUBLIC CORPORATION, Sakai (JP)

(72) Inventors: Satoru Watano, Sakai (JP); Hideya Nakamura, Sakai (JP)

(73) Assignee: OSAKA PREFECTURE UNIVERSITY PUBLIC CORPORATION, Osaka (JP)

( * ) Notice: Subject to any disclaimer, the term of this patent is extended or adjusted under 35 U.S.C. 154(b) by 162 days.

(21) Appl. No.: 16/327,015

(22) PCT Filed: Aug. 21, 2017

(86) PCT No.: PCT/JP2017/029731
§ 371 (c)(1),
(2) Date: Feb. 21, 2019

(87) PCT Pub. No.: WO2018/038037
PCT Pub. Date: Mar. 1, 2018

(65) Prior Publication Data
US 2019/0198870 A1 Jun. 27, 2019

(30) Foreign Application Priority Data
Aug. 22, 2016 (JP) .................. 2016-162003

(51) Int. Cl.
*H01M 4/00* (2006.01)
*H01M 4/40* (2006.01)
(Continued)

(52) U.S. Cl.
CPC ............ *H01M 4/405* (2013.01); *H01M 4/36* (2013.01); *H01M 4/40* (2013.01); *H01M 4/48* (2013.01);
(Continued)

(58) Field of Classification Search
CPC ......... H01M 4/40; H01M 4/36; H01M 4/587; H01M 2004/028; H01M 4/405;
(Continued)

(56) References Cited

U.S. PATENT DOCUMENTS

2014/0057180 A1 2/2014 Iwasaki
2014/0287324 A1 9/2014 Tsuchida et al.

FOREIGN PATENT DOCUMENTS

JP 2007-149438 A 6/2007
JP 2010-67499 A 3/2010
(Continued)

OTHER PUBLICATIONS

Japan Patent Office, International Search Report issued in corresponding Application No. PCT/JP2017/029731, dated Oct. 10, 2017.
(Continued)

*Primary Examiner* — Cynthia H Kelly
*Assistant Examiner* — Monique M Wills
(74) *Attorney, Agent, or Firm* — Stites & Harbison, PLLC; Jeffrey A. Haeberlin

(57) ABSTRACT

A composite positive electrode active material for an all-solid-state secondary battery containing particles of a positive electrode active material and a sulfide-based solid electrolyte layer coating surfaces of the particles, wherein the composite positive electrode active material has an average roundness that is 1.3 times or more of that of a positive electrode active material at an inner core of the composite positive electrode active material.

12 Claims, 21 Drawing Sheets

(51) Int. Cl.

| | |
|---|---|
| *H01M 4/485* | (2010.01) |
| *H01M 4/505* | (2010.01) |
| *H01M 4/525* | (2010.01) |
| *H01M 4/587* | (2010.01) |
| *H01M 10/054* | (2010.01) |
| *H01M 10/0562* | (2010.01) |
| *H01M 4/36* | (2006.01) |
| *H01M 10/052* | (2010.01) |
| *H01M 4/48* | (2010.01) |
| *H01M 4/58* | (2010.01) |
| *H01M 10/0525* | (2010.01) |
| *H01M 4/02* | (2006.01) |

(52) U.S. Cl.
CPC ........... *H01M 4/485* (2013.01); *H01M 4/505* (2013.01); *H01M 4/525* (2013.01); *H01M 4/58* (2013.01); *H01M 4/587* (2013.01); *H01M 10/052* (2013.01); *H01M 10/054* (2013.01); *H01M 10/0525* (2013.01); *H01M 10/0562* (2013.01); *H01M 2004/028* (2013.01); *Y02E 60/10* (2013.01); *Y02T 10/70* (2013.01)

(58) Field of Classification Search
CPC .. H01M 10/052; H01M 4/48; H01M 10/0525; Y02E 60/10
See application file for complete search history.

(56) References Cited

FOREIGN PATENT DOCUMENTS

| | | |
|---|---|---|
| JP | 2013-254620 A | 12/2013 |
| JP | 2017-152347 A | 8/2017 |
| WO | 2012/157046 A1 | 11/2012 |

OTHER PUBLICATIONS

Kawaguchi, Takeshi, et al. "Dry coating of electrode particle with model particle of sulfide solid electrolytes for all-solid-state secondary battery," Powder Technology, 323 (2018) 581-587.

European Patent Office, Supplementary European Search Report issued in corresponding Application No. 17843517.8 dated Mar. 12, 2020.

(a) Example 1f (b) Comparative Example 1b (c) Comparative Example 1c (a)

(b)

(c)

COMPOSITE POSITIVE ELECTRODE ACTIVE MATERIAL FOR ALL-SOLID-STATE SECONDARY BATTERY, METHOD FOR MANUFACTURING SAME, POSITIVE ELECTRODE, AND ALL-SOLID-STATE SECONDARY BATTERY

TECHNICAL FIELD

The present invention relates to a composite positive electrode active material for an all-solid-state secondary battery, a method for producing the same, a positive electrode and an all-solid-state secondary battery. More specifically, the present invention relates to a composite positive electrode active material for an all-solid-state secondary battery having improved charge and discharge properties, a method for producing the same, a positive electrode and an all-solid-state secondary battery.

BACKGROUND ART

Lithium secondary batteries have high voltage and high capacity, and thus are often used for power sources of mobile phones, digital cameras, camcorders, notebook computers, electric cars and the like. Generally marketed lithium secondary batteries contain, as electrolytes, liquid electrolytes containing electrolyte salts dissolved in non-aqueous solvents. As many non-aqueous solvents are flammable, it is desired to ensure safety thereof.

In order to ensure safety thereof, all-solid-state lithium secondary batteries have been proposed in which electrolytes are formed from solid materials, namely are solid electrolytes, without using non-aqueous solvents. Positive electrodes of the batteries contain various components such as positive electrode active materials, conductive materials and electrolytes. For example, Japanese Unexamined Patent Application Publication No. 2007-149438 (Patent Document 1) proposes in FIG. 1 a composite for a positive electrode comprising more than one particle of a positive electrode active material in a layer of a solid electrolyte.

CITATION LIST

Patent Literature

Patent Document 1: Japanese Unexamined Patent Application Publication No. 2007-149438

SUMMARY OF INVENTION

Technical Problems

Patent Document 1 discloses in FIG. 1 a composite containing more than one positive electrode active materials mixed in a layer of a solid electrolyte. The solid electrolyte in the positive electrode reduces an electrical resistivity between the positive electrode active materials to facilitate transfer of metal ions that are inserted to and extracted from the positive electrode active materials and contribute to charge and discharge reactions. Therefore, it is preferable that positive electrode active materials are individually dispersed and the surface of each material is in contact with the solid electrolyte. Further, there was a need for decreasing the proportion of the solid electrolyte in the positive electrode and increasing the proportion of the positive electrode active material in order to further increase the charge/discharge capacity.

Solution to Problems

The inventors of the present invention exhaustively examined components of positive electrodes in order to further improve the charge/discharge capacity, and as a result, found that the charge/discharge capacity can be improved without reducing ion conductivity by coating the surface of particles of a positive electrode active material with smooth solid electrolyte layers and smoothing the solid electrolyte layers, thereby achieving the present invention.

Thus, the present invention provides a composite positive electrode active material for an all-solid-state secondary battery containing particles of a positive electrode active material and a sulfide-based solid electrolyte layer coating surfaces of the particles, wherein the composite positive electrode active material has an average roundness $R_{ave}$ that is 1.3 times or more of that of a positive electrode active material at an inner core of the composite positive electrode active material, wherein the average roundness $R_{ave}$ is defined by following formulae (1) and (2):

[Expression 1]

$$\text{Average roundness } R_{ave} = \frac{1}{N_p}\sum_{j=1}^{N_p} R_j \qquad (1)$$

$$R_j = \text{median}\left(\frac{r_1}{r_A}, \frac{r_2}{r_A} \ldots \frac{r_n}{r_A}\right) \qquad (2)$$

wherein $N_p$ is the number of measured particles; $R_j$ is the roundness of individual particle; median( ) is the median of the numerical values in the brackets; $r_1, r_2 \ldots r_n$ are respectively the curvature radius of each projection in a two-dimensional projected figure of a particle measured; n is the total number of the projections of which curvature radii are measured; and $r_A$ is the circle equivalent radius of a particle measured.

The present invention further provides a positive electrode for an all-solid-state secondary battery, formed with a composite positive electrode active material containing particles of a positive electrode active material and a sulfide-based solid electrolyte layer coating surfaces of the particles, wherein a value obtained by multiplying a contact ratio calculated from a cross-sectional image of the positive electrode by an area occupancy ratio is 40% or more, wherein the contact ratio is a percentage of the length of an interface at which the positive electrode active material contacts the solid electrolyte layer relative to the length of an interface of the positive electrode active material; and the area occupancy ratio is an area occupancy ratio of the positive electrode active material.

The present invention also provides a positive electrode containing the composite positive electrode active material.

The present invention further provides an all-solid-state secondary battery containing the positive electrode, a negative electrode and a solid electrolyte layer positioned between the positive electrode and the negative electrode.

The present invention also provides a method for producing the composite positive electrode active material, including the step of subjecting particles of the positive electrode active material and a sulfide-based solid electrolyte to a dry particle blending process in an inert gas atmosphere having a low water concentration, the dry particle blending process being selected from a high-speed impact system, a compression shear system, an impact compression shear system and a mixing shear friction system.

Advantageous Effects of Invention

The present invention can provide an composite positive electrode active material for an all-solid-state secondary battery having improved charge and discharge properties, a method for producing the same, a positive electrode containing the composite positive electrode active material, and an all-solid-state secondary battery having improved charge and discharge properties.

In any of the following cases, a composite positive electrode active material for an all-solid-state secondary battery having more improved charge and discharge properties may be provided:

(1) the composite positive electrode active material has an average roundness of 0.3 to 1.0 and a positive electrode active material at an inner core of the composite positive electrode active material has an average roundness of 0.1 to 0.5;

(2) a median diameter ratio obtained by dividing a median diameter of the composite positive electrode active material by a median diameter of the positive electrode active material at the inner core is 0.8 to 1.3, and a coefficient of variation ratio obtained by dividing a coefficient of variation of the particle diameter distribution of the composite positive electrode active material by the coefficient of variation of the particle diameter distribution of the positive electrode active material at the inner core is 0.5 to 2.0;

(3) the composite positive electrode active material contains the positive electrode active material and the solid electrolyte layer at a proportion of 100:1 to 50 (mass ratio);

(4) the positive electrode active material has a median diameter of 0.1 to 100 μm;

(5) the solid electrolyte layer coats 50% or more of the surface of the positive electrode active material;

(6) the positive electrode active material is a substance capable of inserting and extracting a metal ion according to charge and discharge of the all-solid-state secondary battery;

(7) the positive electrode active material is selected from (i) an alkali metal which is Li or Na;

(ii) a compound containing a metal selected from Li, Na, Mg, In, Cu and Mn and an element selected from Sn, Si, Al, Ge, Sb and P;

(iii) an oxide, nitride or phosphate containing Li or Na and an element selected from Co, Ni, Mn, Al, Mg, Co, Fe, Zn, Ti, V and Si;

(iv) an oxide or sulfide of a metal selected from V, Mo, Ti and Fe; and (v) graphite and hard carbon, and the solid electrolyte layer is selected from an electrolyte layer represented by a lithium-based solid electrolyte of $Li_{4-x}Ge_{1-x}P_xS_4$, $Li_2S$—$GeS_2$, $Li_7P_3S_{11}$, $Li_6PS_5Cl$, $Li_{3.833}Sn_{0.833}AS_{0.166}S_4$, $Li_{10}SnP_2S_{12}$, $Li_2S$—$SiS_2$—$Li_3N$, $Li_{9.54}Sn_{1.74}P_{1.44}S_{11.7}Cl_{0.3}$, $Li_2S$—$SiS_2$, $Li_2S$—$SiS_2$—$Li_x$-$MO_y$ (M is Si, P, Ge, B, Al, Ga or In), $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and $Li_2S$—$P_2S_5$; and a sodium-based solid electrolyte of $Na_3PS_4$, $Na_2S$—$GeS_2$—$Ga_2S_3$, $Na_2S$—$GeS_2$, $Na_3Zr_2Si_2PO_{12}$, $Na_2S$—$SiS_2$, $NaI$—$Na_2S$—$SiS_2$, $NaI$—$Na_2S$—$P_2S_5$, $NaI$—$Na_2S$—$B_2S_3$, $Na_3PO_4$—$Na_2S$—$Si_2S$, $Na_3PO_4$—$Na_2S$—$SiS_2$, $NaPO_4$—$Na_2S$—$SiS$, $NaI$—$Na_2S$—$P_2O_5$, $NaI$—$Na_3PO_4$—$P_2S_5$ and $Na_2S$—$P_2S_5$; and (8) the positive electrode active material is selected from Li, LiM (M is Sn, Si, Al, Ge, Sb or P), $Mg_xM$ (M is Sn, Ge or Sb), $M_ySb$ (M is In, Cu or Mn), $LiCoO_2$, $LiNiO_2$, $LiMn_2O_4$, $Li_{0.44}MnO_2$, $LiNi_{0.5}Mn_{0.5}O_2$, $LiCo_{1/3}Ni_{1/3}Mn_{1/3}O_2$, $Li_{1+x}Mn_{2-x-y}M_yO_4$ (M is one or more metal elements selected from Al, Mg, Co, Fe, Ni and Zn), $Li_xTiO_y$, $Li_xSi_yO_z$, $LiFeO_2$, $LiCoN$, $LiMPO_4$ (M is Fe, Mn, Co or Ni), $Li_3V_2(PO_4)_3$, $V_2O_5$, $MoO_3$, $TiS_2$, $FeS$, graphite and hard carbon, using lithium as a metal ion, Na, NaM (M is Sn, Si, Al, Ge, Sb or P), $Mg_xM$ (M is Sn, Ge or Sb), $M_ySb$ (M is In, Cu or Mn), $NaCoO_2$, $NaNiO_2$, $NaMn_2O_4$, $Na_{0.44}MnO_2$, $NaNi_{0.5}Mn_{0.5}O_2$, $NaCo_{1/3}Ni_{1/3}Mn_{1/3}O_2$, $Na_{1+x}Mn_{2-x-y}M_yO_4$ (M is one or more metal elements selected from Al, Mg, Co, Fe, Ni and Zn), $Na_xTiO_y$, $Na_xSi_yO_z$, $NaFeO_2$, $NaCoN$, $NaMPO_4$ (M is Fe, Mn, Co or Ni), $Na_3V_2(PO_4)_3$, $V_2O_5$, $MoO_3$, $TiS_2$, FeS, and graphite and hard carbon, using sodium as a metal ion.

BRIEF DESCRIPTION OF DRAWINGS

FIG. 6 is a view illustrating appearance of the composite positive electrode active material of Comparative Example 1a.

Figure 1:
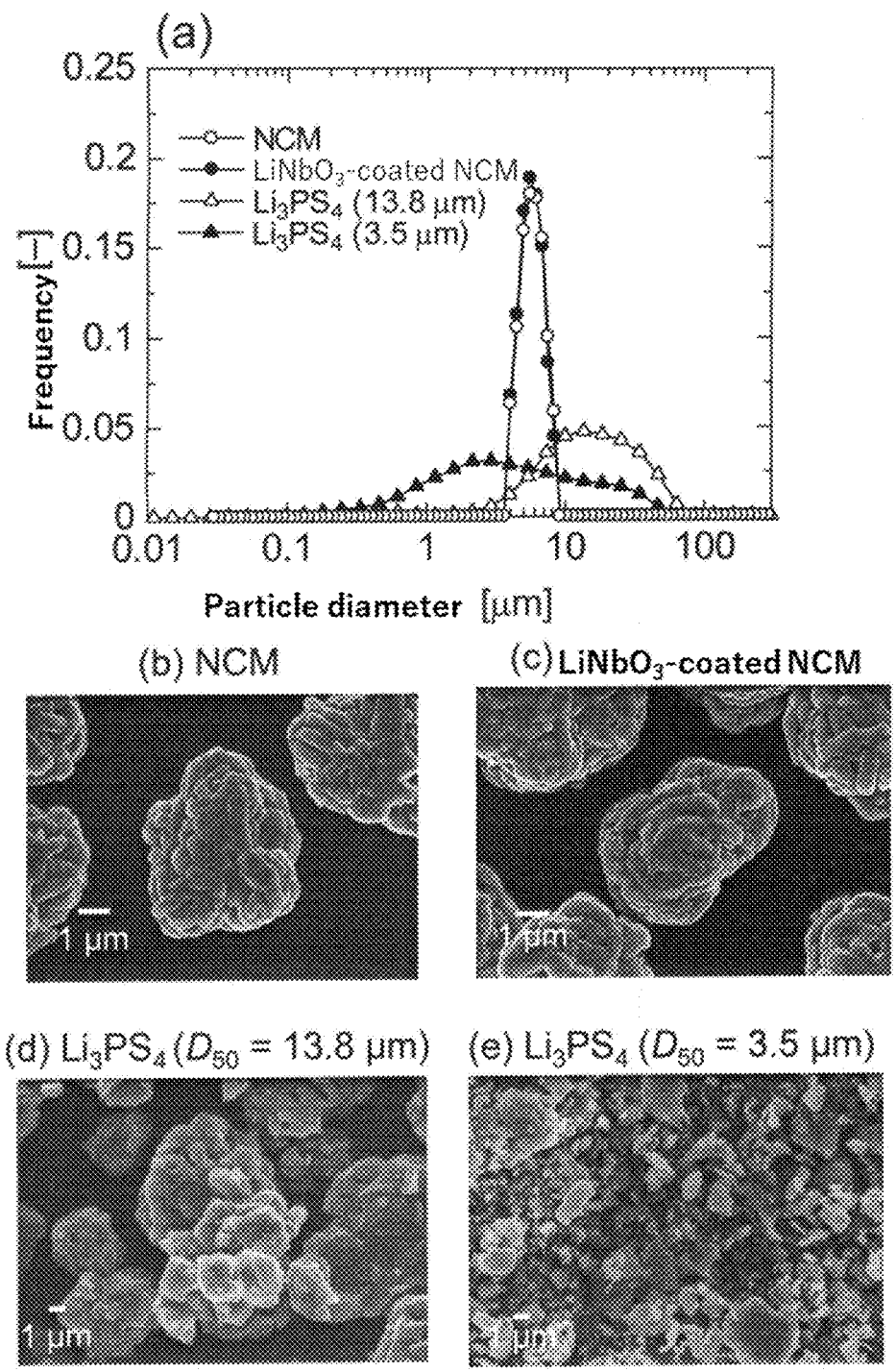
FIG. 1 is a view illustrating the volume-based particle size distribution and appearance of positive electrode active materials and solid electrolytes used in Examples 1a to 1e.

DESCRIPTION OF EMBODIMENTS (1) Composite Positive Electrode Active Material

The composite positive electrode active material is used for an all-solid-state secondary battery and contains particles of a positive electrode active material and a sulfide-based solid electrolyte layer coating surfaces of the particles. The composite positive electrode active material has an average roundness that is 1.3 times or more of that of a positive electrode active material at an inner core of the composite positive electrode active material. The variation in the average roundness means that the surface of the composite positive electrode active material is smoother than the surface of the positive electrode active material at an inner core. The variation in the average roundness may be 1.3 times, 1.4 times, 1.5 times, 1.7 times, 2.0 times, 2.5 times or 3.0 times. The variation in the average roundness is more preferably 1.5 times or more and still more preferably 2.0 times or more. The positive electrode active material at an inner core may be hereinafter merely referred to as "positive electrode active material".

The positive electrode active material at an inner core preferably has an average roundness of 0.1 to 0.5. When the average roundness is less than 0.1, the surface of the positive electrode active material may be too rough to coat the surface of the positive electrode active material with the solid electrolyte layer. When the average roundness is above 0.5, the bonding strength between the positive electrode active material and the solid electrolyte layer is decreased and the solid electrolyte layer may be easily detached. The average roundness may be 0.1, 0.15, 0.2, 0.25, 0.3, 0.35, 0.4, 0.45 or 0.5. The average roundness is more preferably in the range of 0.2 to 0.45 and still more preferably in the range of 0.2 to 0.4.

The average roundness of the positive electrode active material at an inner core may be obtained from a positive electrode active material obtained by removing the solid electrolyte layer from the composite positive electrode active material, or from a cross-sectional image of the composite positive electrode active material. The average roundness may also be obtained from a positive electrode active material prior to coating with the solid electrolyte layer.

The composite positive electrode active material preferably has an average roundness of 0.3 or more. When the average roundness is less than 0.3, the surface of the positive electrode active material may not be uniformly coated with the solid electrolyte, reducing the charge/discharge capacity of the all-solid-state secondary battery. The average roundness may be 0.3, 0.4, 0.5, 0.6, 0.7, 0.8, 0.9 or 1.0. The average roundness is more preferably 0.4 or more, still more preferably 0.5 or more and particularly preferably 0.7 or more. The upper limit of the roundness is 1.0.

It is preferable that a median diameter ratio obtained by dividing a median diameter of the composite positive electrode active material by a median diameter of the positive electrode active material at an inner core is 0.8 to 1.3. When the median diameter ratio is above 1.3, more than one particle of the positive electrode active material agglomerates and is mixed in the composite positive electrode active material, and the all-solid-state secondary battery may have decreased charge/discharge capacity. The median diameter ratio of less than 0.8 represents that broken particles generated by breakage of the positive electrode active material are mixed in the composite positive electrode active material, and in this case, the all-solid-state secondary battery may have decreased charge/discharge capacity. The median diameter ratio may be 0.8, 0.9, 1.0, 1.1, 1.2 or 1.3. The median diameter as used herein means a particle diameter at a cumulative fraction of 50% in a cumulative particle diameter distribution.

It is preferable that a coefficient of variation ratio obtained by dividing a coefficient of variation of the particle diameter distribution of the composite positive electrode active material by a coefficient of variation of the particle diameter distribution of the positive electrode active material at an inner core is 0.5 to 2.0. When the coefficient of variation ratio is above 2.0, broken particles generated by breakage of the positive electrode active material are mixed in the composite positive electrode active material or more than one particle of the positive electrode active material agglomerates and is mixed in the composite positive electrode active material, and thus the all-solid-state secondary battery may have decreased charge/discharge capacity. When the coefficient of variation ratio is less than 0.5, the positive electrode active material at an inner core belonging to a small particle diameter section and the positive electrode active material at an inner core belonging to a large particle diameter section are mixed in the composite positive electrode active material, and thus the all-solid-state secondary battery may have decreased charge/discharge capacity. The coefficient of variation of the particle diameter distribution may be 0.5, 0.7, 0.9, 1.0, 1.2, 1.4, 1.6, 1.8 or 2.0. The coefficient of variation of the particle diameter distribution is obtained by dividing a standard deviation in a particle diameter distribution by the median diameter described above.

The composite positive electrode active material preferably contains the positive electrode active material and the solid electrolyte layer at a proportion of 100:1 to 50 (mass ratio). When the proportion of the solid electrolyte layer is less than 1 (mass ratio), the solid electrolyte layer may not be able to coat the surface of the positive electrode active material and some of the positive electrode active material may not contribute to charge and discharge reaction. When the proportion is above 50 (mass ratio), the all-solid-state secondary battery containing the positive electrode may have decreased charge/discharge capacity. The composite positive electrode active material may contain the positive electrode active material and the solid electrolyte layer at a proportion of 100:1, 10, 20, 30, 40 or 50 (mass ratio). The composite positive electrode active material more preferably contains the positive electrode active material and the solid electrolyte layer at a proportion of 100:1 to 30 (mass ratio) and still more preferably at a proportion of 100:1 to 20 (mass ratio).

The solid electrolyte layer preferably coats 50% or more of the surface of the positive electrode active material. When the extent of coating is less than 50%, the solid electrolyte layer may not be able to coat the surface of the positive electrode active material and some of the positive electrode active material may not contribute to charge and discharge reaction. The extent of coating may be 50%, 60%, 70%, 80%, 90%, 99% or 100%. The extent of coating is preferably 90% or more and still more preferably 99% or more. The upper limit of the extent of coating is 100%.

(a) Particles of the Positive Electrode Active Material

The positive electrode active material is not particularly limited as far as the positive electrode active material is in the form of particles. The particles may be agglomerated primary particles (referred to as agglomerated particles), free primary particles without agglomeration (referred to as non-agglomerated particles) and a mixture of the foregoing.

The positive electrode active material is preferably formed with agglomerated particles and non-agglomerated particles having a median diameter of 0.1 to 100 μm. When the median diameter is less than 0.1 μm, more than one particle of the positive electrode active material agglomerates and is mixed in the composite positive electrode active material, and the all-solid-state secondary battery may have decreased charge/discharge capacity. When the median diameter is above 100 μm, the positive electrode active material may be broken during the blending process step, and thus the all-solid-state secondary battery may have decreased charge/discharge capacity. The median diameter may be 0.1 μm, 1.0 μm, 3 μm, 10 μm, 20 μm, 50 μm, 70 μm or 100 μm. The median diameter is more preferably in the range of 1 to 50 μm and still more preferably in the range of 3 to 20 μm. The median diameter as used herein means a particle diameter at a cumulative fraction of 50% in a volume-based cumulative particle diameter distribution.

The positive electrode active material is generally a substance that can insert and extract a metal ion according to charge and discharge of an all-solid-state secondary battery. The substance may be selected from, for example:
(i) an alkali metal which is Li or Na;
(ii) a compound containing a metal selected from Li, Na, Mg, In, Cu and Mn and an element selected from Sn, Si, Al, Ge, Sb and P;
(iii) an oxide, nitride or phosphate containing Li or Na and an element selected from Co, Ni, Mn, Al, Mg, Co, Fe, Zn, Ti, V and Si;
(iv) an oxide or sulfide of a metal selected from V, Mo, Ti and Fe; and
(v) graphite and hard carbon.

More specifically, the substance may be selected from:
Li as the substance (i); LiM (M is Sn, Si, Al, Ge, Sb or P), $Mg_xM$ (M is Sn, Ge or Sb) and $M_ySb$ (M is In, Cu or Mn) as the substance (ii); $LiCoO_2$, $LiNiO_2$, $LiMn_2O_4$, $Li_{0.44}MnO_2$, $LiNi_{0.5}Mn_{0.5}O_2$, $LiCo_{1/3}Ni_{1/3}Mn_{1/3}O_2$, $Li_{1+x}Mn_{2-x-y}M_yO_4$ (M is one or more metal elements selected from Al, Mg, Co, Fe, Ni and Zn), $Li_xTiO_y$, $Li_xSi_yO_z$, $LiFeO_2$, $LiCoN$, $LiMPO_4$ (M is Fe, Mn, Co or Ni) and $Li_3V_2(PO_4)_3$ as the substance (iii); $V_2O_5$, $MoO_3$, $TiS_2$, $FeS$ as the substance (iv); and graphite and hard carbon as the substance (v); and, using lithium as the metal ion,
Na as the substance (i); NaM (M is Sn, Si, Al, Ge, Sb or P), $Mg_xM$ (M is Sn, Ge or Sb) and $M_ySb$ (M is In, Cu or Mn) as the substance (ii); $NaCoO_2$, $NaNiO_2$, $NaMn_2O_4$, $Na_{0.44}MnO_2$, $NaNi_{0.5}Mn_{0.5}O_2$, $NaCo_{1/3}Ni_{1/3}Mn_{1/3}O_2$, $Na_{1+x}Mn_{2-x-y}M_yO_4$ (M is one or more metal elements selected from Al, Mg, Co, Fe, Ni and Zn), $Na_xTiO_y$, $Na_xSi_yO_z$, $NaFeO_2$, $NaCoN$, $NaMPO_4$ (M is Fe, Mn, Co or Ni) and $Na_3V_2(PO_4)_3$ as the substance (iii); $V_2O_5$, $MoO_3$, $TiS_2$ and FeS as the substance (iv); and graphite and hard carbon as the substance (v),
using sodium as the metal ion.

(b) Sulfide-Based Solid Electrolyte Layer

The solid electrolyte layer may be selected from, for example, sulfide-based solid electrolytes represented by $A_2S-M_xS_y$ (A is Li or Na, M is selected from P, Si, Ge, B, Al and Ga, and x and y are integers providing the stoichiometric proportion according to the type of M). Specific examples of $A_2S$ include $Li_2S$ and $Na_2S$. Examples of $M_xS_y$ include $P_2S_5$, $SiS_2$, $GeS_2$, $B_2S_3$, $Al_2S_3$ and $Ga_2S_3$. $A_2S-M_xS_y$ in case of A being Li means, for example, $Li_2S-P_2S_5$.

The molar ratio between $A_2S$ and $M_xS_y$ is preferably 67:33 to 87.5:12.5 and more preferably 70:30 to 80:20.

The solid electrolyte represented by $A_2S-M_xS_y$ may be those commercially available, or may be obtained by, for example, subjecting a raw material mixture containing $A_2S$ and $M_xS_y$ providing $A_2S-M_xS_y$ at a predetermined ratio to mechanical milling.

The solid electrolyte may contain, in addition to $A_2S-M_xS_y$, other electrolytes such as LiI, $Li_3PO_4$, NaI and $Na_3PO_4$.

Specific solid electrolytes include:
lithium-based solid electrolytes including $Li_{4-x}Ge_{1-x}P_xS_4$, $Li_2S-GeS_2$, $Li_7P_3S_{11}$, $Li_6PS_5Cl$, $Li_{3.833}Sn_{0.833}As_{0.166}S_4$, $Li_{10}SnP_2S_{12}$, $Li_2S-SiS_2-Li_3N$, $Li_{9.54}Sn_{1.74}P_{1.44}S_{11.7}Cl_{0.3}$, $Li_2S-SiS_2$, $LiI-Li_2S-SiS_2$, $Li_2S-SiS_2-Li_xMO_y$ (M is Si, P, Ge, B, Al, Ga or In), $LiI-Li_2S-P_2S_5$, $Li_3PO_4-Li_2S-Si_2S$, $Li_3PO_4-Li_2S-SiS_2$, $LiPO_4-Li_2S-SiS$, $LiI-Li_3PO_4-P_2S_5$ and $Li_2S-P_2S_5$; and sodium-based solid electrolytes including $Na_3PS_4$, $Na_2S-GeS_2-Ga_2S_3$, $Na_2S-GeS_2$, $Na_3Zr_2Si_2PO_{12}$, $Na_2S-SiS_2$, $NaI-Na_2S-SiS_2$, $NaI-Na_2S-P_2S_5$, $NaI-Na_2S-B_2S_3$, $Na_3PO_4-Na_2S-Si_2S$, $Na_3PO_4-Na_2S-SiS_2$, $NaPO_4-Na_2S-SiS$, $NaI-Na_2S-P_2O_5$, $NaI-Na_3PO_4-P_2S_5$ and $Na_2S-P_2S_5$.

(c) Production Method

The composite positive electrode active material may be produced through the step of subjecting particles of the positive electrode active material and the sulfide-based solid electrolyte to a dry particle blending process in an inert gas atmosphere having a low water concentration.

The inert gas atmosphere means an atmosphere that is not reactive with the positive electrode active material and the solid electrolyte. Examples of the inert atmosphere include an atmosphere of argon, nitrogen and the like. In view of preventing decomposition of the solid electrolyte, the atmosphere preferably has an oxygen concentration of 50 ppm or less. In the same point of view, the atmosphere preferably has a water concentration of −65° C. or lower as a dewpoint.

The dry particle blending process may be selected from a high-speed impact system, a compression shear system, an impact compression shear system and a mixing shear friction system.

The high-speed impact system may include a high-speed air flow impact system, a vertical rotor impact system and the like. The compression shear system may include an angmill system, an interactive system of an elliptical mixing container with an elliptical rotor, and the like. The impact compression shar system may include a ring media-type compression shear system and the like. The mixing shear friction system may include a tumbling ball mill system, a vertical ball mill system, a vertical spiral motion ball mill system, an agitation tumbling granulation system and the like. Among the above dry particle blending processes, the high-speed air flow impact system is preferable. When the high-speed air flow impact system is used, the composite positive electrode active material may be produced with, for example, a tip speed of a rotor that generates a high-speed air flow of 80 to 100 m/s and a process time in the system of 3 to 10 minutes.

(2) Positive Electrode

The positive electrode is formed with a composite positive electrode active material containing particles of the positive electrode active material and the sulfide-based solid electrolyte layer coating surfaces of the particles. The positive electrode also has a value obtained by multiplying the contact ratio by the area occupancy ratio (hereinafter also referred to as "contact ratio×area occupancy ratio") of 40% or more. The contact ratio as used herein is a percentage of the length of an interface at which the positive electrode active material contacts the solid electrolyte layer relative to the length of an interface of the positive electrode active material. The area occupancy ratio is an area occupancy ratio of the positive electrode active material. The contact ratio and the area occupancy ratio are calculated from a cross-sectional image of the positive electrode. The method for calculation is specifically described in Examples. When the contact ratio×area occupancy ratio is 40% or more, an all-solid-state secondary battery provided may have high charge/discharge capacity and a high charge/discharge cycle number. The contact ratio×area occupancy ratio may be 40%, 50%, 60%, 70%, 80% or 90%.

The positive electrode generally contains the composite positive electrode active material. When the composite positive electrode active material having the above specific average roundness is used for production of a positive electrode, the positive electrode having a contact ratio×area occupancy ratio of 40% or more may be more suitable produced.

The positive electrode may contain a conductive material. The conductive material is not particularly limited, and may include carbon materials that are used as conductive materials in the field of secondary batteries such as carbon black such as acetylene black (AB), Denka black and ketjen black, carbon nanotubes, natural graphite, artificial graphite and vapor grown carbon fiber (VGCF).

It is preferable the conductive material is contained at a proportion of 10 parts by weight or less relative to 100 parts by weight of the positive electrode active material. When the proportion is above 10 parts by weight, the relative amount of the positive electrode active material in the positive electrode is decreased and the charge/discharge capacity may be decreased.

The positive electrode may contain a binder. Examples of the binder include polyvinylidene fluoride, polytetrafluoroethylene, polyvinyl acetate, poly(methyl methacrylate), polyethylene and the like.

The positive electrode may be obtained in the form of pellets by, for example, press-molding raw materials. The positive electrode may be formed on a collector made of a metal plate such as aluminum, copper and SUS. Other than the method for obtaining a positive electrode in the form of pellets, the positive electrode may be obtained in the form of sheet by dispersing the composite positive electrode active material and optionally a conductive material and a binder in a solvent to obtain a slurry, applying the slurry on a collector to obtain a coating film and drying the coating film.

(3) All-Solid-State Secondary Battery

The all-solid-state secondary battery contains the positive electrode, an electrolyte layer and a negative electrode. The all-solid-state secondary battery may be obtained by, for example, stacking and pressing the positive electrode, the electrolyte layer and the negative electrode.

(Electrolyte Layer)

The electrolyte forming the electrolyte layer is not particularly limited and may be any electrolytes that are generally used for all-solid-state secondary batteries. Examples of the electrolyte include those represented by $A_2S-M_xS_y$ (A is Li or Na, M is selected from P, Si, Ge, B, Al and Ga and x and y are integers providing the stoichiometric proportion according to the type of M).

In $M_xS_y$, M is selected from P, Si, Ge, B, Al and Ga and x and y are numbers providing the stoichiometric proportion according to the type of M. Six elements that may be M may have various valences and x and y may be selected according to the valence thereof. For example, P may be trivalent and pentavalent, Si may be tetravalent, Ge may be divalent and tetravalent, B may be trivalent, Al may be trivalent and Ga may be trivalent. Specific $M_xS_y$ may include $P_2S_5$, $SiS_2$, $GeS_2$, $B_2S_3$, $Al_2S_3$, $Ga_2S_3$ and the like. The specific $M_xS_y$ used may be one or more than one type in combination. Among others, $P_2S_5$ is particularly preferred.

The molar ratio between $A_2S$ and $M_xS_y$ is preferably 50:50 to 90:10, more preferably 67:33 to 80:20 and still more preferably 70:30 to 80:20.

The electrolyte may contain, in addition to $A_2S-M_xS_y$, other electrolytes such as LiI, $Li_3PO_4$, NaI and $Na_3PO_4$.

Specific electrolyte may include:

lithium-based solid electrolytes including $Li_{4-x}Ge_{1+x}P_xS_4$, $Li_2S$—$GeS_2$, $Li_7P_3S_{11}$, $Li_6PS_5Cl$, $Li_{3.833}Sn_{0.833}As_{0.166}S_4$, $Li_{10}SnP_2S_{12}$, $Li_2S$—$SiS_2$—$Li_3N$, $Li^{9.54}Sn_{1.74}P_{1.44}S_{11.7}Cl_{0.3}$, $Li_2S$—$SiS_2$, LiI—$Li_2S$—$SiS_2$, $Li_2S$—$SiS_2$—$Li_xMO_y$, (M is Si, P, Ge, B, Al, Ga or In), LiI—$Li_2S$—$P_2S_5$, $Li_3PO_4$—$Li_2S$—$Si_2S$, $Li_3PO_4$—$Li_2S$—$SiS_2$, $LiPO_4$—$Li_2S$—SiS, LiI—$Li_3PO_4$—$P_2S_5$ and $Li_2S$—$P_2S_5$; and sodium-based solid electrolytes including $Na_3PS_4$, $Na_2S$—$GeS_2$—$Ga_2S_3$, $Na_2S$—$GeS_2$, $Na_3Zr_2Si_2PO_{12}$, $Na_2S$—$SiS_2$, NaI—$Na_2S$—$SiS_2$, NaI—$Na_2S$—$P_2S_5$, NaI—$Na_2S$—$B_2S_3$, $Na_3PO_4$—$Na_2S$—$Si_2S$, $Na_3PO_4$—$Na_2S$—$SiS_2$, $NaPO_4$—$Na_2S$—SiS, NaI—$Na_2S$—$P_2O_5$, NaI—$Na_3PO_4$—$P_2S_5$ and $Na_2S$—$P_2S_5$.

In the electrolyte layer, $A_2S-M_xS_y$ preferably accounts for 90% by weight or more and more preferably 100% by weight. The electrolyte layer preferably has a thickness of 100 μm or less and more preferably 20 μm or less. The electrolyte layer may be obtained in the form of pellets by, for example, pressing the electrolyte.

(Negative Electrode)

The negative electrode is not particularly limited and may be any negative electrodes that are generally used for all-solid-state secondary batteries. The negative electrode may be formed only with a negative electrode active material or may be a mixture thereof with a binder, a conductive material, a solid electrolyte and the like.

The negative electrode active material may include metals such as In and Sn, alloys thereof, graphite, hard carbon, various transition metal oxides such as SnO and $TiO_2$. The negative electrode active material used may contain Li or Na such as Li, Na, $Li_{4/3}Ti_{5/3}O_4$ and $Na_2Ti_3O_7$.

Examples of the binder include polyvinylidene fluoride, polytetrafluoroethylene, polyvinyl acetate, poly(methyl methacrylate), polyethylene and the like.

The conductive material may include natural graphite, artificial graphite, AB (acetylene black), VGCF (vapor grown carbon fiber), carbon nanotubes, active charcoal and the like.

The solid electrolyte may be an electrolyte used for electrolyte layers.

The negative electrode may be obtained in the form of pellets by, for example, mixing a negative electrode active material and optionally a binder, a conductive material, an electrolyte and the like and pressing the obtained mixture. A metal sheet (foil) made of a metal or an alloy thereof may be used for a negative electrode active material as it is.

The negative electrode may be formed on a collector such as aluminum, copper and SUS.

EXAMPLES

The present invention is hereinafter more specifically described by way of Examples which do not limit the present invention.

(Composite Positive Electrode Active Material)

Examples 1a to 1e

The positive electrode active material used was $LiNi_{1/3}Co_{1/3}Mn_{1/3}O_2$ (manufactured by Toda Kogyo Corp., NCM-03, median diameter $D_{50}$ was 5.2 μm, true density: 4794 kg/m³, hereinafter merely referred to as NCM) or a $LiNbO_3$-coated NCM (median diameter $D_{50}$ was 5.2 μm) which was NCM coated with $LiNbO_3$. $LiNbO_3$-coated NCM was prepared according to the following procedure.

In 887 g of ethanol solvent, 31.1 g of ethoxy lithium was dissolved and 190.9 g of pentaethoxy niobium was added to the obtained solution to obtain a solution for coating formation, so that ethanol contained 0.6 mol/L, respectively, of ethoxy lithium and pentaethoxy niobium.

A positive electrode active material was coated with the solution for coating formation on a tumbling fluidized coater (manufactured by Powrex Corp., MP-01).

A positive electrode active material (1250 g) was charged in the tumbling fluidized coater and dry air of 0.25 m³/min, 50° C. was introduced as fluidized gas. The positive electrode active material was blown up by dry air and circulated in the tumbling fluidized coater, and the prepared solution for coating formation was sprayed from a spray nozzle at 4 g/min. The tumbling fluidized coater was run for 8 hours, thereby obtaining NCM coated with the solution.

NCM coated with the solution was subjected to heat treatment in an electric furnace in the atmosphere at 350° C. for 5 hours to obtain $LiNbO_3$-coated NCM.

The sulfide-based solid electrolytes used were $Li_3PS_4$ (75 $Li_2S$-25$P_2S_5$, manufactured by Admatechs) prepared to have a median diameter $D_{50}$ of 13.8 μm or 3.5 μm. FIG. 1(a) indicates the volume-based particle size distribution of the used positive electrode active material and solid electrolyte. FIG. 1(a) shows the results measured on a laser diffraction scattering particle size distribution analyzer (manufactured by Shimadzu Corporation, SALD-2100). FIGS. 1(b), 1(c), 1(d) and 1(e) show electron micrographs of NCM, $LiNbO_3$-coated NCM, $Li_3PS_4$ having a median diameter $D_{50}$ of 13.8 μm and $Li_3PS_4$ having a median diameter $D_{50}$ of 3.5 μm, respectively.

$Li_3PS_4$ having a median diameter $D_{50}$ of 13.8 μm and 3.5 μm was obtained by treating 300 g of methoxybenzene solution containing a starting material $Li_3PS_4$ at 6.2% by mass in an argon-substituted glove bag on a multi-ring media wet milling machine (manufactured by Nara Machinery Co., Ltd., MICROS-0) at a rotor rotation speed of 2000 rpm for 180 minutes.

Five composite positive electrode active materials (10 g each) indicated in Table 1 below were produced with the above starting materials through the step of mixing the positive electrode active material and the solid electrolyte for 30 minutes and a dry blending process step on a high-speed air flow impact machine (manufactured by Nara Machinery Co., Ltd., NHS-0). Dry blending process was performed at a rotor rotation speed of 13000 rpm for 5 minutes.

TABLE 1

| Unit | Positive electrode active material — | Median diameter $D_{50}$ of solid electrolyte μm | Positive electrode active material: solid electrolyte Mass ratio |
|---|---|---|---|
| Ex. 1a | NCM | 13.8 | 76:24 |
| Ex. 1b | NCM | 13.8 | 84:16 |
| Ex. 1c | $LiNbO_3$-coated NCM | 3.5 | 85:15 |
| Ex. 1d | $LiNbO_3$-coated NCM | 3.5 | 90:10 |
| Ex. 1e | $LiNbO_3$-coated NCM | 3.5 | 95:5 |

Figure 2:
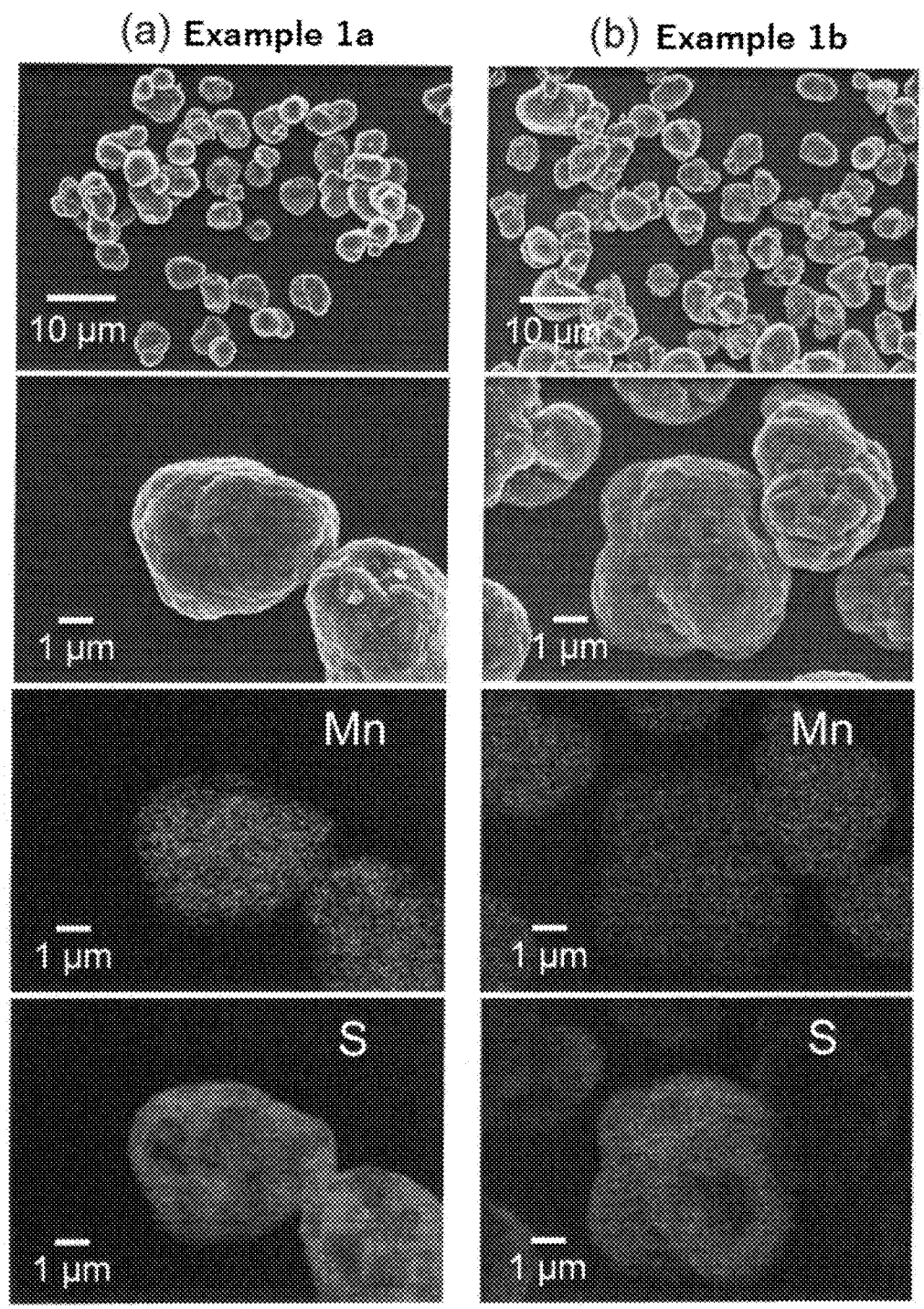
FIG. 2 is a view illustrating appearance of composite positive electrode active materials of Examples 1a and 1b.
Figure 3:
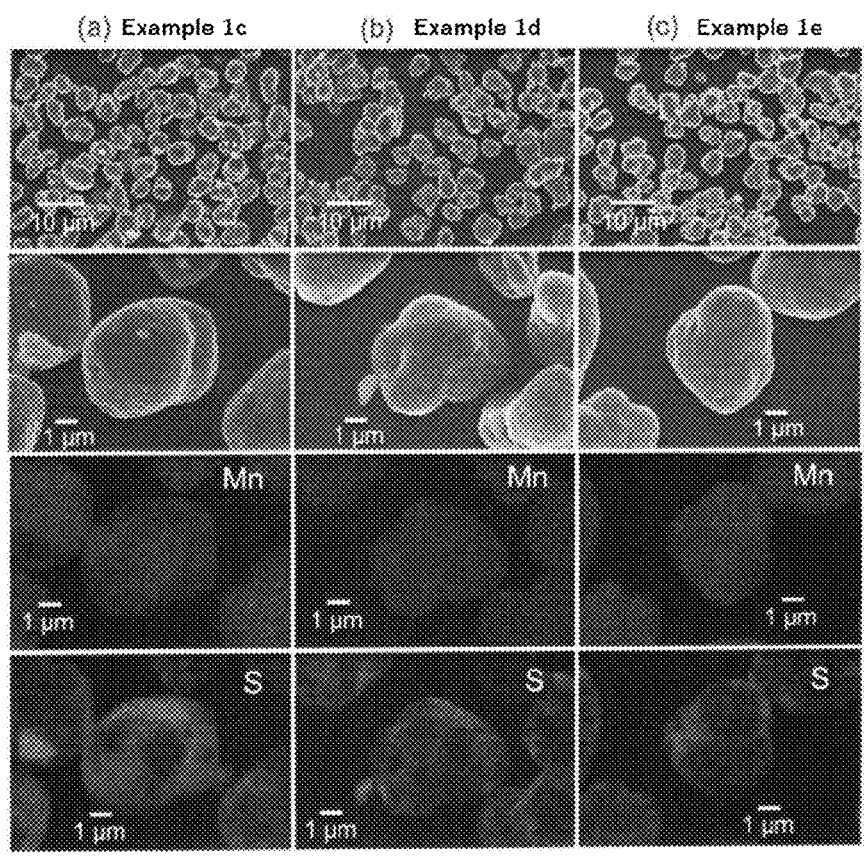
FIG. 3 is a view illustrating appearance of composite positive electrode active materials of Examples 1c to 1e.

Table 2 indicates the average roundness, median diameter and coefficient of variation of the particle diameter distribution of the composite positive electrode active materials and the positive electrode active material at an inner core of the composite positive electrode active material. The median diameter and the coefficient of variation of the particle diameter distribution indicated in Table 2 were obtained from a number-based particle size distribution of circle equivalent diameters of 50 particles randomly selected from those observed under an electron microscope at 10000-fold magnification. FIGS. 2(a) and (b) illustrate electron micrographs, magnified photographs thereof and EDX mapping images of Mn and S of the magnified photographs for the composite positive electrode active materials of Examples 1a and 1b. Further, FIGS. 3(a) to (c) illustrate electron micrographs, magnified photographs thereof and EDX mapping images of Mn and S of the magnified photographs for the composite positive electrode active materials of Examples 1c to 1e. The photographs in FIG. 2(a) to FIG. 3(c) are, from top to bottom, electron micrographs, magnified photographs thereof, EDX mapping images of Mn of the magnified photographs and EDX mapping images of S of the magnified photographs for the composite positive electrode active materials (the same applies to the following). The photographs and images were obtained on a field emission scanning electron microscope (manufactured by Hitachi High-Technologies Corporation, SU8200) equipped with the energy dispersive X-ray spectrometric function.

TABLE 2

| | Average roundness [—] | Median diameter [μm] | Coefficient of variation of the particle diameter distribution [—] | Median diameter ratio [—] | Coefficient of variation ratio [—] |
|---|---|---|---|---|---|
| Positive electrode active material inner core | 0.352 | 5.2 | 0.10 | — | — |
| Example 1a | 0.522 | 5.7 | 0.13 | 1.09 | 1.33 |
| Example 1b | 0.524 | 5.5 | 0.18 | 1.05 | 1.87 |

TABLE 2-continued

| | Average roundness [—] | Median diameter [μm] | Coefficient of variation of the particle diameter distribution [—] | Median diameter ratio [—] | Coefficient of variation ratio [—] |
|---|---|---|---|---|---|
| Example 1c | 0.709 | 5.3 | 0.08 | 1.02 | 0.83 |
| Example 1d | 0.705 | 5.6 | 0.13 | 1.07 | 1.32 |
| Example 1e | 0.696 | 5.5 | 0.14 | 1.05 | 1.39 |

From Table 2, it was found that the composite positive electrode active materials of Examples 1a to 1e respectively had an average roundness that was 1.4 times or more of that of the positive electrode active material at an inner core of the composite positive electrode active material. It was also found from FIG. 2(a) to FIG. 3(c) that the composite positive electrode active materials of Examples 1a to 1e respectively had a decreased surface roughness compared to the positive electrode active material at an inner core of the composite positive electrode active material. From Table 2, it was found that the composite positive electrode active materials of Examples 1a to 1e respectively had a median diameter ratio of 1.02 to 1.09 relative to the positive electrode active material at an inner core of the composite positive electrode active material, and a coefficient of variation ratio of 0.83 to 1.87. It was found that the composite positive electrode active material of Examples 1a to 1e had almost the same particle diameter distribution compared to the positive electrode active material at an inner core of the composite positive electrode active material. Further, from FIG. 2(a) to FIG. 3(c), it was found that the percentage of coating of the surface of the positive electrode active material with the solid electrolyte layer in the respective composite positive electrode active materials was about 100%.

Figure 4:
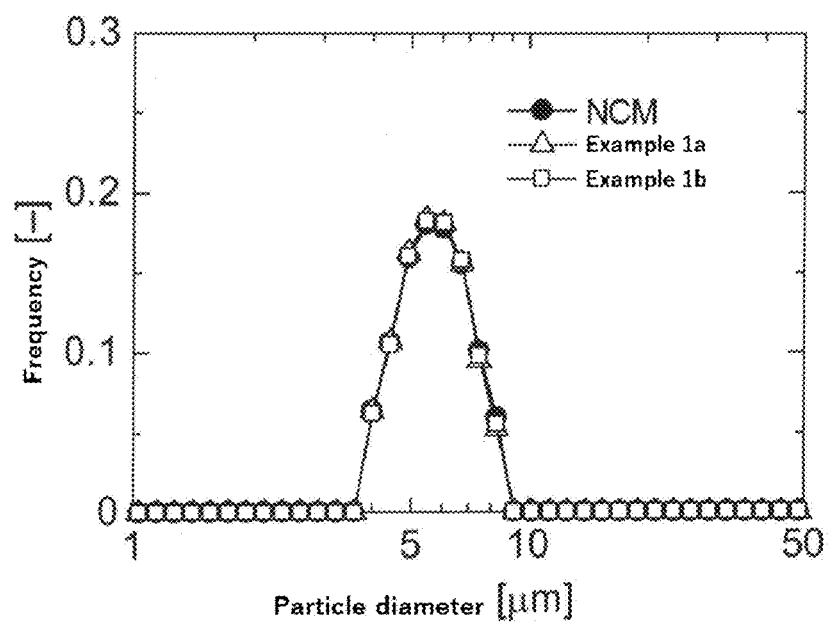
FIG. 4 is a view illustrating the volume-based particle size distribution of positive electrode active materials recovered from the composite positive electrode active materials of Examples 1a and 1b.
Figure 5:
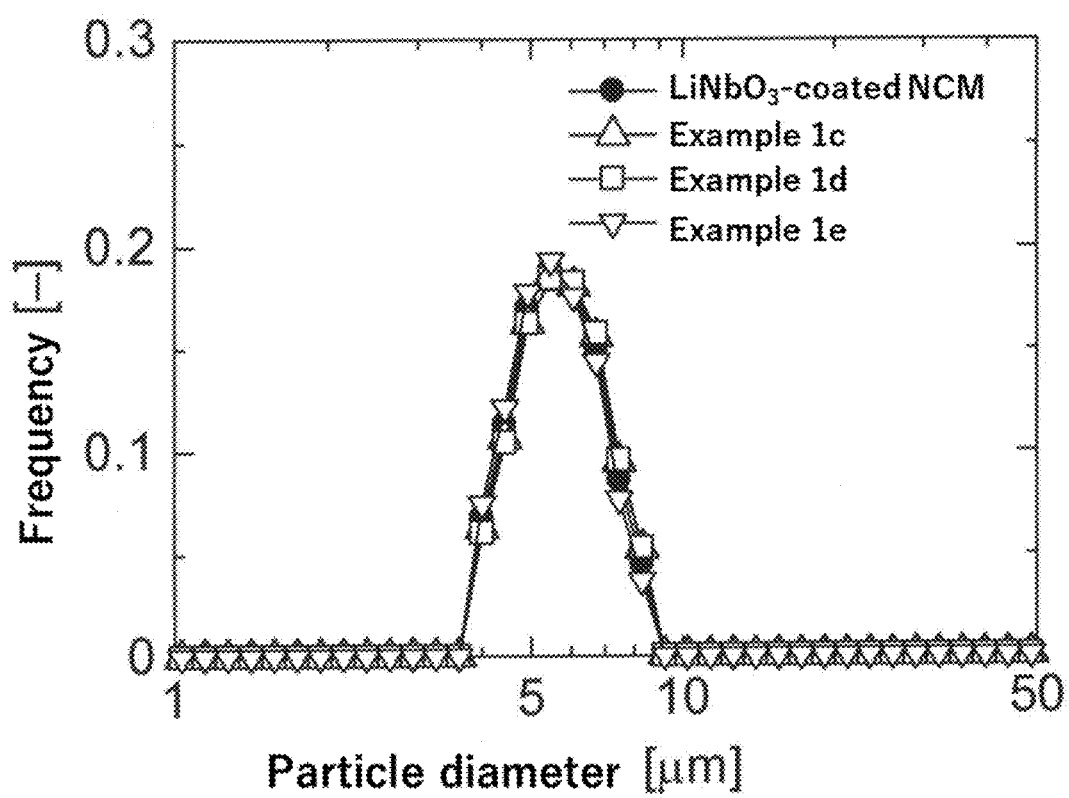
FIG. 5 is a view illustrating the volume-based particle size distribution of positive electrode active materials recovered from the composite positive electrode active materials of Examples 1c to 1e.

The positive electrode active materials were recovered by dissolving and removing the solid electrolyte layers in the composite positive electrode active materials of Examples 1a to 1e with ethanol. The volume-based particle size distribution of the recovered positive electrode active materials is illustrated in FIGS. 4 and 5 together with that of the starting materials NCM and LiNbO₃-coated NCM. From the drawings, it was found that even after the dry blending process step, the positive electrode active materials were not worn or broken.

Comparative Example 1a

A composite positive electrode active material was obtained in the same manner as in Example 1c except that LiNbO₃-coated NCM and Li₃PS₄ prepared to have a median diameter D₅₀ of 3.5 μm at 85:15 (mass ratio) were placed in a 50-ml screw vial and mixed on a voltex mixer (manufactured by AS ONE Corporation, NHS-F60) for 3 minutes without the step of pre-mixing the positive electrode active material and the solid electrolyte or the dry blending process step on the high-speed air flow impact machine.

Figure 6:
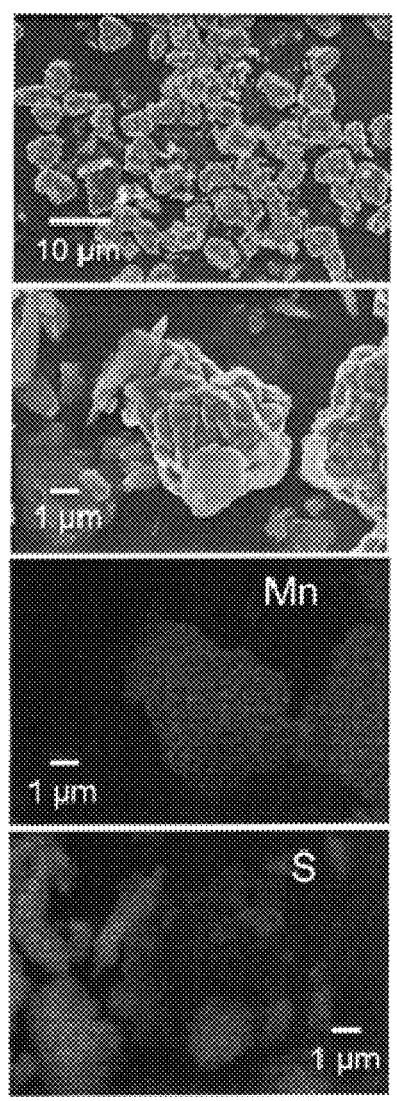

Table 3 indicates the average roundness of the composite positive electrode active material and the positive electrode active material at an inner core of the composite positive electrode active material. FIG. 6 illustrates an electron micrograph, a magnified photograph thereof and EDX mapping images of Mn and S of the magnified photograph for the composite positive electrode active material of Comparative Example 1a.

TABLE 3

| | | Unit | Comp. Ex. 1a |
|---|---|---|---|
| Average roundness | Positive electrode active material inner core | — | 0.352 |
| | Composite positive electrode active material | — | 0.292 |

From Table 3, it was found that the composite positive electrode active material of Comparative Example 1a had an average roundness that was less than 0.9 times of that of the positive electrode active material at an inner core of the composite positive electrode active material. It was also found from FIG. 6 that the composite positive electrode active material of Comparative Example 1a had higher surface roughness than the composite positive electrode active materials of Examples 1a to 1e. Further, it was found from FIG. 6 that a part of the composite positive electrode active material had insufficient coating of the surface of the positive electrode active material with the solid electrolyte layer.

Example 1f and Comparative Examples 1b and 1c

Composite positive electrode active materials were obtained in the same manner as in Example 1c except that the time of dry blending process was 10 minutes (Example 1f), 30 seconds (Comparative Example 1b) or 2 minutes (Comparative Example 1c).

Figure 7:
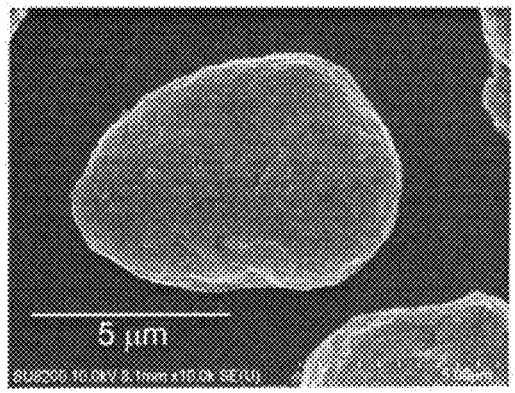
FIG. 7 is a view illustrating appearance of composite positive electrode active materials of Example 1f, Comparative Example 1b and Comparative Example 1c.
Figure 7:
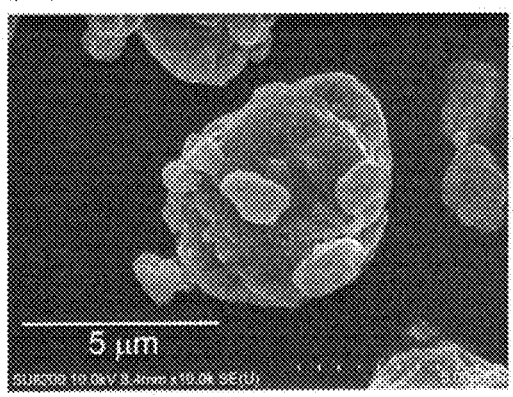
Figure 7:
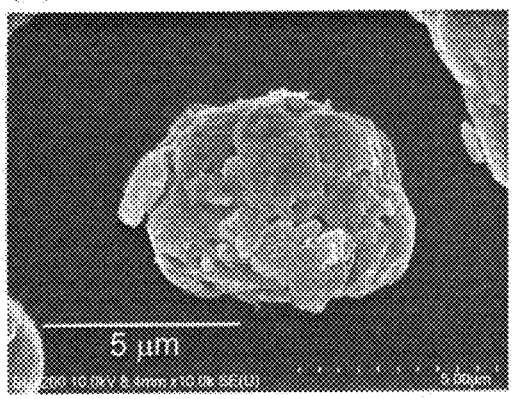

Table 4 indicates the average roundness, median diameter and coefficient of variation of the particle diameter distribution of the composite positive electrode active materials and the positive electrode active material at an inner core of the composite positive electrode active materials. FIGS. 7(a) to (c) illustrate electron micrographs of the composite positive electrode active materials of Example 1f, Comparative Example 1b and Comparative Example 1c.

TABLE 4

| | Average roundness [—] | Median diameter [μm] | Coefficient of variation of the particle diameter distribution [—] | Median diameter ratio [—] | Coefficient of variation ratio [—] |
|---|---|---|---|---|---|
| Positive electrode active material inner core | 0.352 | 5.2 | 0.10 | — | — |
| Ex. 1f | 0.616 | 5.6 | 0.10 | 1.08 | 0.97 |
| Comp. Ex. 1b | 0.321 | 6.0 | 0.10 | 1.16 | 1.02 |
| Comp. Ex. 1c | 0.446 | 5.7 | 0.12 | 1.09 | 1.17 |

From Table 4, it was found that the composite positive electrode active material of Example 1f had an average roundness that was 1.7 times or more of that of the positive electrode active material at an inner core of the composite positive electrode active material. Meanwhile, the composite positive electrode active materials of Comparative Examples 1b and 1c respectively had an average roundness that was less than 1.3 times of that of the positive electrode active material at an inner core of the composite positive electrode active material. It was also found from FIGS. 7(a) to (c) that the composite positive electrode active material of Example 1f had decreased surface roughness compared to the composite positive electrode active materials of Comparative Examples 1b and 1c. It was found from the median diameter ratio and the coefficient of variation ratio in Table 4 that the composite positive electrode active material of Example 1f had almost the same particle diameter distribution compared to the positive electrode active material at an inner core of the composite positive electrode active material. Further, it was found from FIG. 7(a) that the percentage of coating of the surface of the positive electrode active material with the solid electrolyte layer in the composite positive electrode active material was about 100%.

Figure 8:
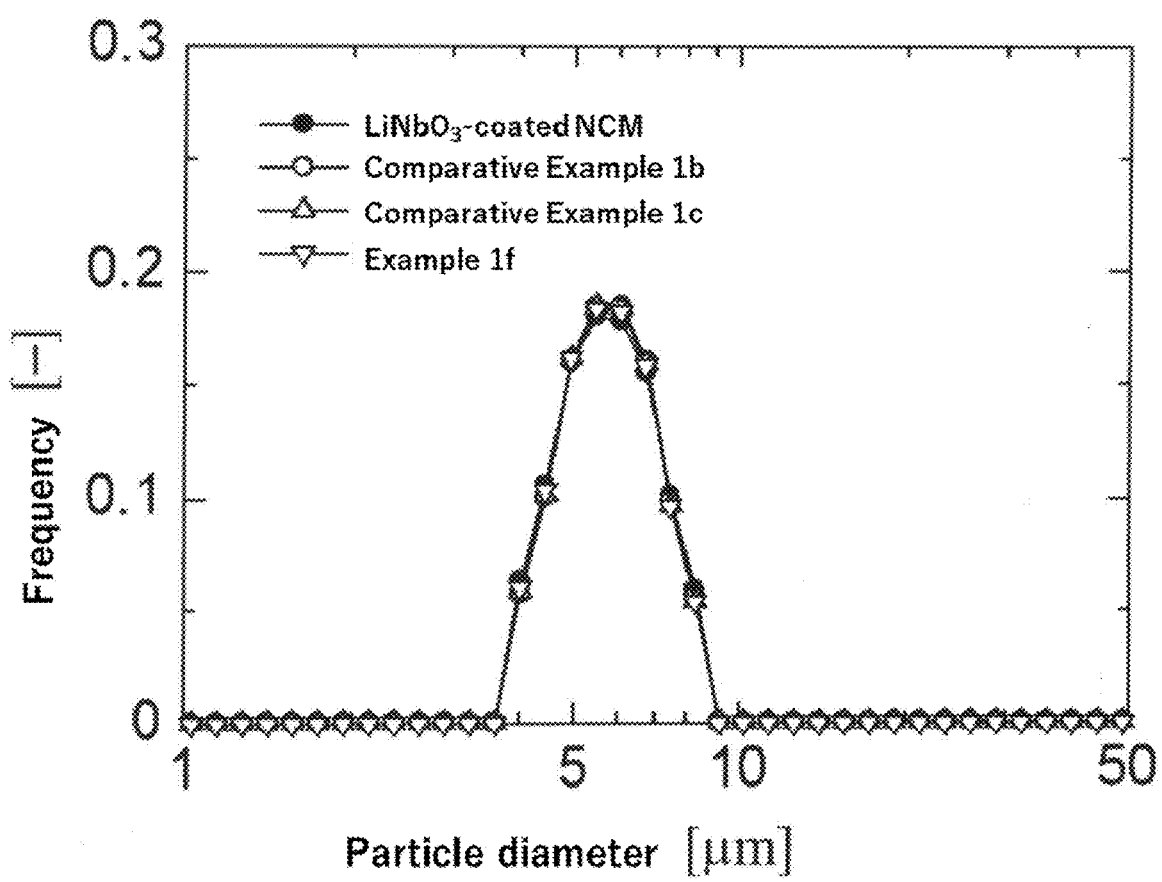
FIG. 8 is a view illustrating the volume-based particle size distribution of the positive electrode active material recovered from the composite positive electrode active material of Example 1f.

As illustrated in FIG. 8, in the composite positive electrode active material of Example 1f, the positive electrode active material was not worn or broken as Examples 1a to 1e even after the dry blending process step.

Example 1g

A composite positive electrode active material was obtained in the same manner as in Example 1c except that the positive electrode active material used was $LiNi_{1/3}Co_{1/3}Mn_{1/3}O_2$ (manufactured by Beijing Easpring Material Technology Co., Ltd., NCM-523-5Y, median diameter $D_{50}$ was 12.3 μm, hereinafter merely referred to as "NCM (12.3 μm)").

Example 1h

A solid electrolyte, $Li_3PS_4$ having a median diameter $D_{50}$ of 1.9 μm (hereinafter merely referred to as "$Li_3PS_4$ (1.9 μm)"), was prepared according to the disclosure in Matsuda et al. "Preparation of $Li_3PS_4$ solid electrolyte by liquid-phase shaking using organic solvents with carbonyl group as complex forming medium", Journal of the Japan Society of Powder and Powder Metallurgy, Vol. 63 (2016) pp. 976-980. A composite positive electrode active material was obtained in the same manner as in Example 1c except that the solid electrolyte was used.

Table 5 indicates the average roundness, median diameter and coefficient of variation of the particle diameter distribution of the composite positive electrode active materials of Examples 1g and 1h and the positive electrode active materials at an inner core of the composite positive electrode active materials.

Figure 9:
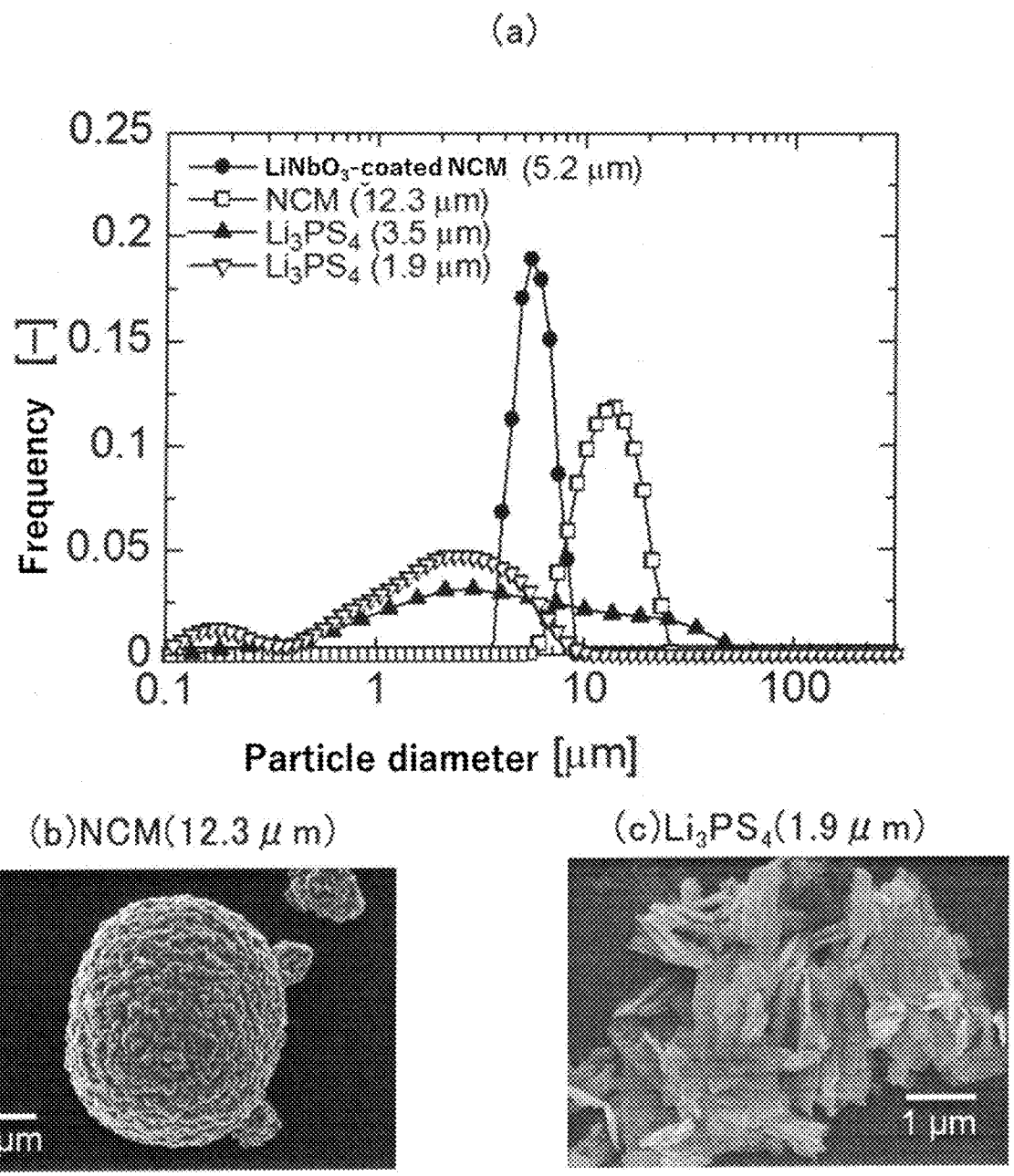
FIG. 9 is a view illustrating the volume-based particle size distribution and appearance of positive electrode active materials and solid electrolytes used in Examples 1g and 1h.

FIG. 9(a) illustrates volume-based particle size distribution of used positive electrode active materials and solid electrolytes. FIG. 9(b) and FIG. 9(c) illustrate electron micrographs of NCM (12.3 μm) of Example 1g and $Li_3PS_4$ (1.9 μm) of Example 1h, respectively.

Figure 10:
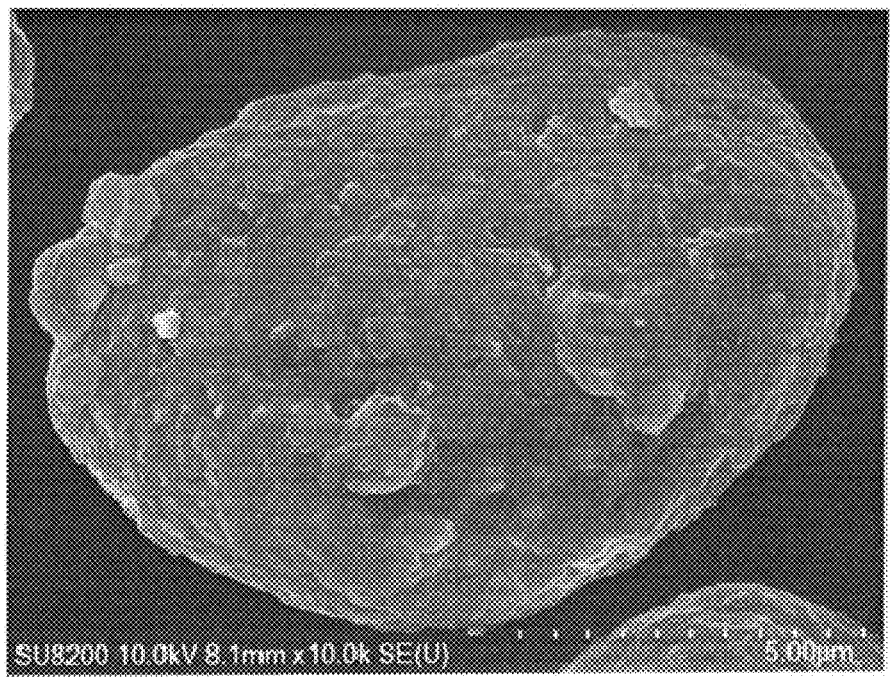
FIG. 10 is a view illustrating appearance of the composite positive electrode active material of Example 1g.
Figure 11:
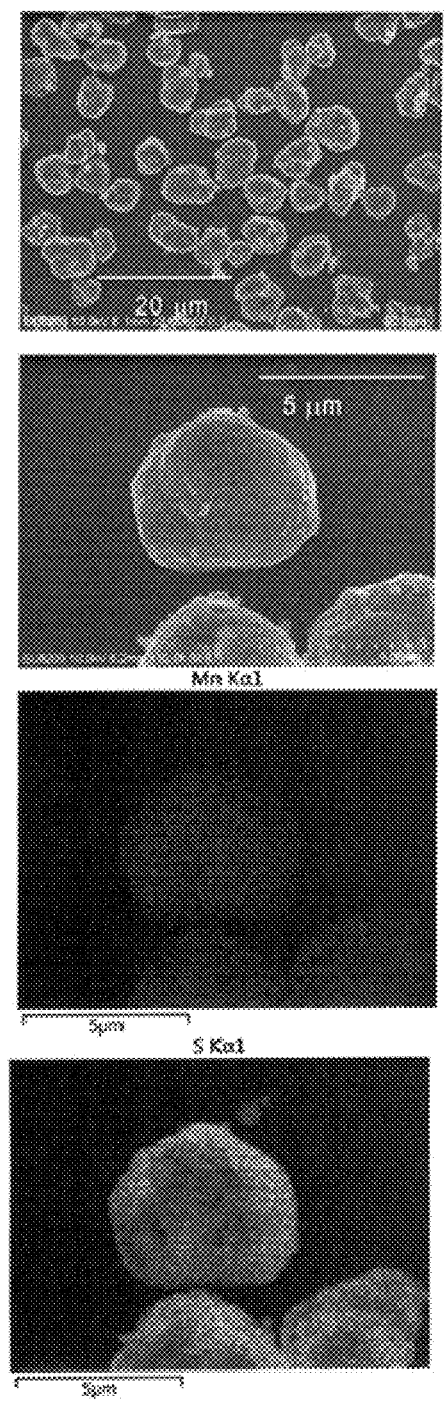
FIG. 11 is a view illustrating appearance of the composite positive electrode active material of Example 1h.

FIG. 10 illustrates an electron micrograph of the composite positive electrode active material of Example 1g. FIG. 11 illustrates an electron micrograph, a magnified photograph thereof and EDX mapping images of Mn and S of the magnified photograph for the composite positive electrode active material of Example 1h.

cores of the composite positive electrode active materials. It was also found from FIG. 9(b) to FIG. 11 that the composite positive electrode active materials of Examples 1g and 1h had decreased surface roughness compared to the positive electrode active materials at an inner core of the composite positive electrode active materials. From the coefficient of variation ratio in Table 5, it was found that the composite positive electrode active materials of Examples 1g and 1h had almost the same particle diameter distribution compared to the positive electrode active materials at an inner core of the composite positive electrode active materials. Further, from FIGS. 10 and 11, it was found that the percentages of coating of the surfaces of the positive electrode active materials with the solid electrolyte layers in the composite positive electrode active materials were about 100%.

(Positive Electrode)

Examples 2a to 2e

Five types of positive electrodes in the form of tablets each having a diameter of 10 mm and a thickness of 0.85 mm were obtained by subjecting five composite positive electrode active materials (250 mg each) of Examples 1a to 1e to pressure of 360 MPa for 1 minute. Electron micrographs, magnified photographs thereof and EDX mapping images of Mn and S of the magnified photographs for the cross-sections of the obtained positive electrodes are illustrated in FIG. 12(a): Example 2a, FIG. 12(b): Example 2b, FIG. 13(a): Example 2c, FIG. 13(b): Example 2d and FIG. 13(c): Example 2e.

From the above Figures, it was found that the solid electrolyte layers were thinly and uniformly present between the positive electrode active materials.

Comparative Example 2

Figure 14:
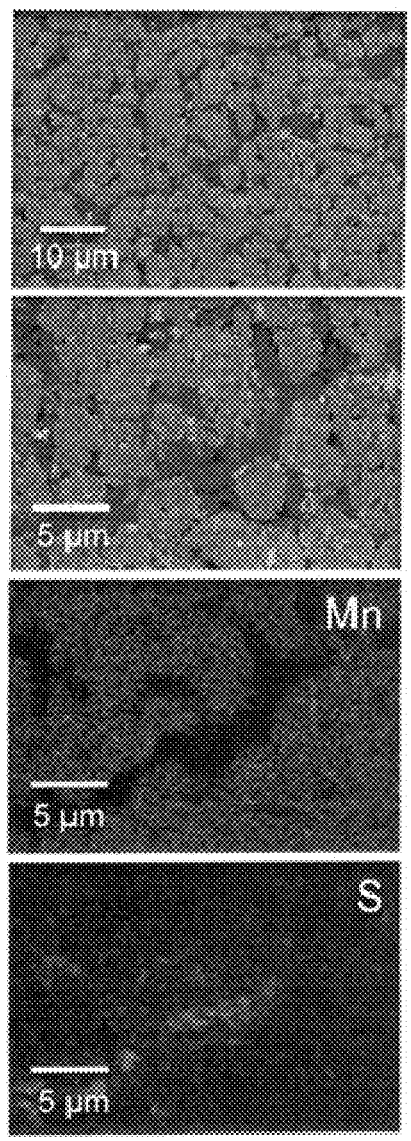
FIG. 14 is a view illustrating appearance of the cross-section of the positive electrode of Comparative Example 2.

A positive electrode was obtained in the same manner as in Example 2 except that the composite positive electrode active material of Comparative Example 1a was used. FIG. 14 illustrates an electron micrograph, a magnified photograph and EDX mapping images of Mn and S of the magnified photograph for the cross-section of the obtained positive electrode.

From the above Figure, it was found that the solid electrolyte layer was not uniformly present between the positive electrode active materials and positive electrode active materials were directly in contact without intervening solid electrolyte layers in some parts.

(All-Solid-State Secondary Battery)

Example 3 and Comparative Example 3

The positive electrode prepared in the same manner as in Example 2c except that 10 mg of the composite positive

TABLE 5

| | Inner core | | | | | Median | | |
|---|---|---|---|---|---|---|---|---|
| Ex. | Median diameter [μm] | Average roundness [—] | Coefficient of Variation [—] | Average roundness [—] | Median diameter [μm] | Coefficient of variation of the particle diameter distribution [—] | diameter ratio [—] | Coefficient of variation ratio [—] |
| 1g | 12.3 | 0.201 | 0.14 | 0.330 | 12.7 | 0.16 | 1.03 | 1.14 |
| 1h | 5.2 | 0.352 | 0.10 | 0.584 | 5.7 | 0.12 | 1.10 | 1.18 |

From Table 5, it was found that the composite positive electrode active materials of Examples 1g and 1h respectively had an average roundness that was 1.6 times or more of that of the positive electrode active materials at inner electrode active material was used, an electrolyte layer and a negative electrode were sandwiched between a pair of collectors and pressed at 360 MPa for 1 minute to obtain an all-solid-state secondary battery (Example 3). The electrolyte layer used was obtained by pressing 80 mg of $Li_3PS_4$ ($75Li_2S-25P_2S_5$, manufactured by Admatechs) at 360 MPa for 1 minute and had a diameter of 10 mm and a thickness of 0.5 mm. The negative electrode used was a lithium-indium alloy foil. The collector was made of SUS.

An all-solid-state secondary battery (Comparative Example 3) was obtained in the same manner as above except that the composite positive electrode active material of Comparative Example 1a was used.

Figure 15:
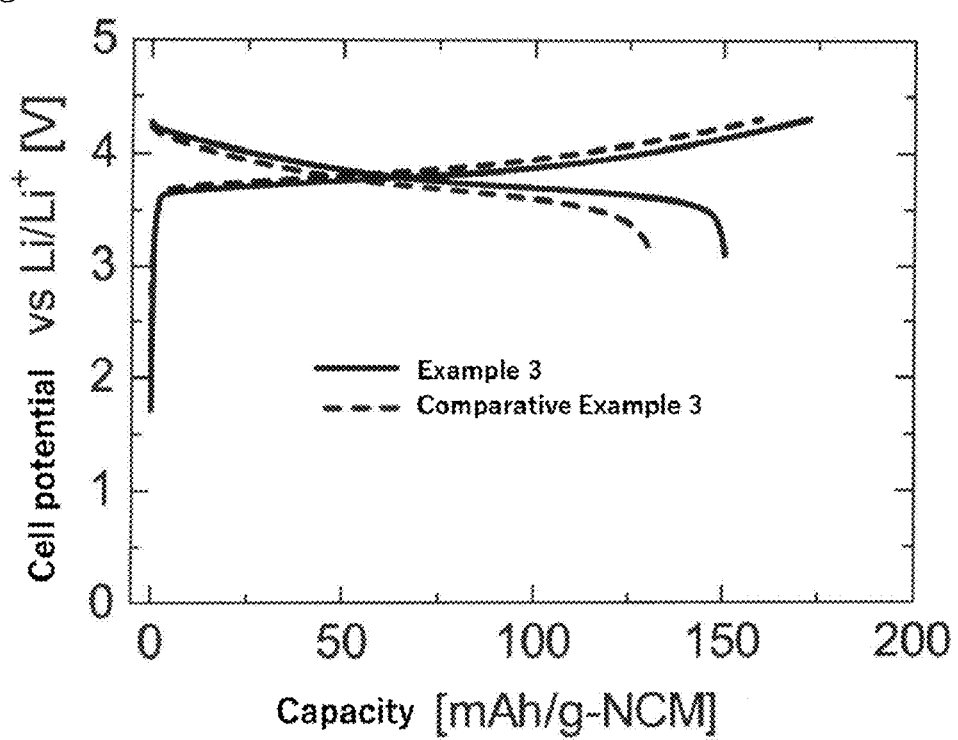
FIG. 15 is a view illustrating the results of the constant current charge and discharge test of all-solid-state secondary batteries of Example 3 and Comparative Example 3.

The all-solid-state secondary batteries were subjected to the constant current charge and discharge test (current density: 0.064 $mA/cm^2$). The final voltages during the test was 3.7 V at the time of charging and 2.5 V at the time of discharging (corresponding to 4.3 V at the time of charging and 3.1 V at the time of discharging in terms of the voltage based on $Li/Li^+$). FIG. 15 illustrates the results. In the Figure, the solid line corresponds to Example 3 and the dotted line corresponds to Comparative Example 3. From FIG. 15, it was found that Example 3 had higher charge/discharge capacity than Comparative Example 3.

Figure 16:
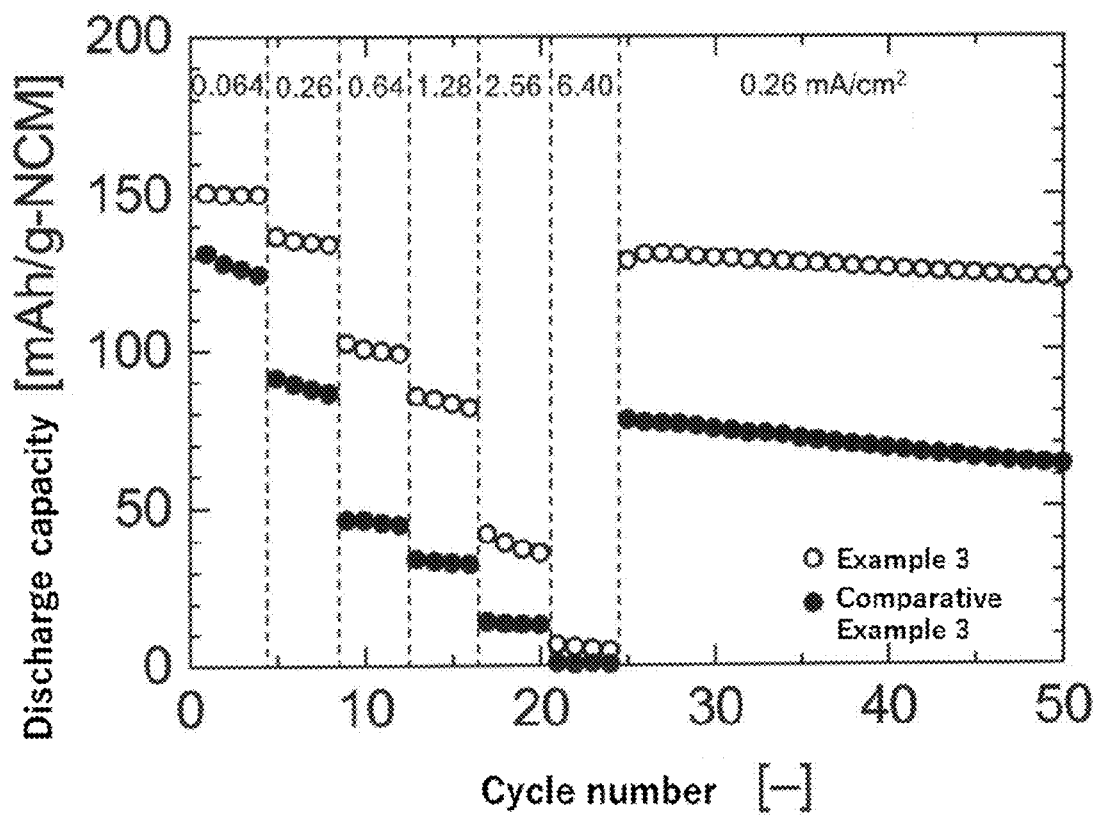
FIG. 16 is a view illustrating the results of the constant current charge and discharge test of all-solid-state secondary batteries of Example 3 and Comparative Example 3.

The all-solid-state secondary batteries of Example 3 and Comparative Example 3 were subjected to the constant current charge and discharge test in the same manner as above except that the current density was increased from low to high (0.064 $mA/cm^2$, 0.26 $mA/cm^2$, 0.64 $mA/cm^2$, 1.28 $mA/cm^2$, 2.56 $mA/cm^2$, 6.40 $mA/cm^2$) at every 4 charge-discharge cycles and kept at 0.26 $mA/cm^2$ after 25 cycles. FIG. 16 illustrates the results. In the Figure, the upper plots correspond to Example 3 and the lower plots correspond to Comparative Example 3. From FIG. 16, it was found that Example 3 had higher charge/discharge capacity than Comparative Example 3 even after charge-discharge cycles.

Example 4 and Comparative Examples 4a and 4b

All-solid-state secondary batteries of Example 4 and Comparative Examples 4a and 4b were obtained in the same manner as in Example 3 except that the composite positive electrode active materials of Example 1f and Comparative Examples 1b and 1c were used respectively.

Figure 17:
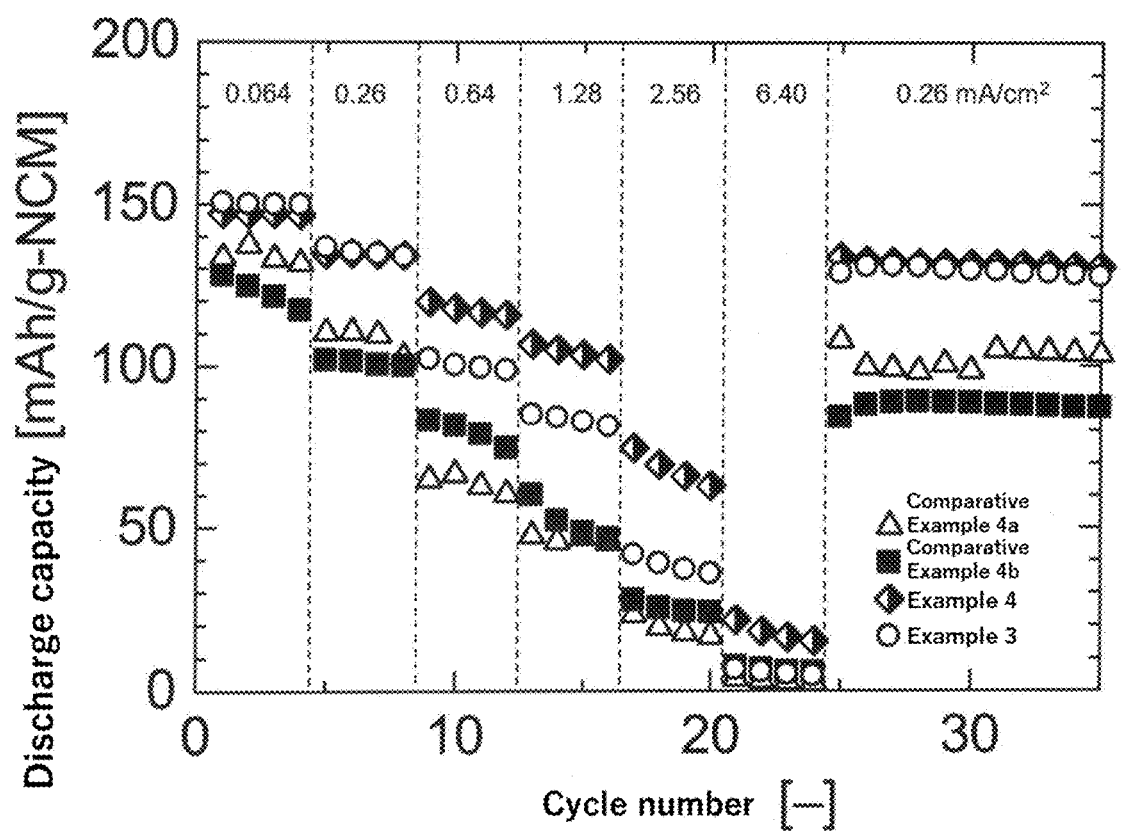
FIG. 17 is a view illustrating the results of the constant current charge and discharge test of all-solid-state secondary batteries of Example 4 and Comparative Examples 4a and 4b.

The all-solid-state secondary batteries of Example 4 and Comparative Examples 4a and 4b were subjected to the constant current charge and discharge test as in Example 3. FIG. 17 illustrates the results. FIG. 17 also illustrates the plots from Example 3. From FIG. 17, it was found that Examples 3 and 4 had higher charge/discharge capacity than Comparative Examples 4a and 4b even after charge-discharge cycles.

Table 6 indicates the first discharge capacity of Examples 3 and 4 and Comparative Examples 4a and 4b together with the average roundness and the average roundness ratio (the ratio of the average roundness of the composite positive electrode active material relative to the average roundness of the positive electrode active material at an inner core of the composite positive electrode active material) of the composite positive electrode active materials used for Examples and Comparative Examples. Table 6 also indicates the first discharge capacity when a liquid electrolyte battery having the following configurations was subjected to the charge/discharge conditions indicated below. The ratios of the first discharge capacities of Examples 3 and 4 and Comparative Examples 4a and 4b relative to the first discharge capacity of the liquid electrolyte battery are also indicated in Table 6 as normalized discharge capacities. The liquid electrolyte battery was used in order to evaluate whether or not the all-solid-state secondary batteries exhibit the performance at a similar level as secondary batteries containing liquid electrolytes that are generally used at present. The liquid electrolyte battery used was an HS cell manufactured by Hohsen Corp. The details for the positive electrode, negative electrode, liquid electrolyte and separator used for the HS cell are indicated below.

The positive electrode used contained NCM as in Example 1a, polytetrafluoroethylene as a binder and acetylene black as a conductive auxiliary agent (mass ratio: 10:1:1). The negative electrode used was Li.

The liquid electrolyte used was a 1-M $LiPF_6$ solution in a mixed solvent of ethylene carbonate (EC) and dimethyl carbonate (DMC) at a volume ratio of 1:1. The separator used was a polypropylene-based separator.

The charge/discharge conditions were: charge/discharge temperature: 30° C., current density: 0.2 $mA/cm^2$, final voltage: 3.7 V at the time of charging and 2.5 V at the time of discharging (corresponding to 4.3 V at the time of charging and 3.1 V at the time of discharging in terms of the voltage based on $Li/Li^+$)

TABLE 6

| | Average roundness [—] | Average roundness ratio [—] | First discharge capacity [mAh/g-NCM] | Normalized discharge capacity [—] |
|---|---|---|---|---|
| Comp. Ex. 4a | 0.321 | 0.912 | 133.4 | 0.88 |
| Comp. Ex. 4b | 0.446 | 1.267 | 127.8 | 0.85 |
| Ex. 4 | 0.616 | 1.750 | 147.0 | 0.97 |
| Ex. 3 | 0.709 | 2.104 | 150.4 | 0.99 |
| Liquid electrolyte battery | — | — | 151.0 | 1.00 |

FIGS. 18(a) to (d) illustrate the relationship between the average roundness ratio and the first discharge capacity or normalized discharge capacity and the relationship between the average roundness and the first discharge capacity or normalized discharge capacity indicated in Table 6. The dotted lines in FIGS. 18(a) to (d) illustrate the first discharge capacity of the liquid electrolyte battery.

Figure 18:
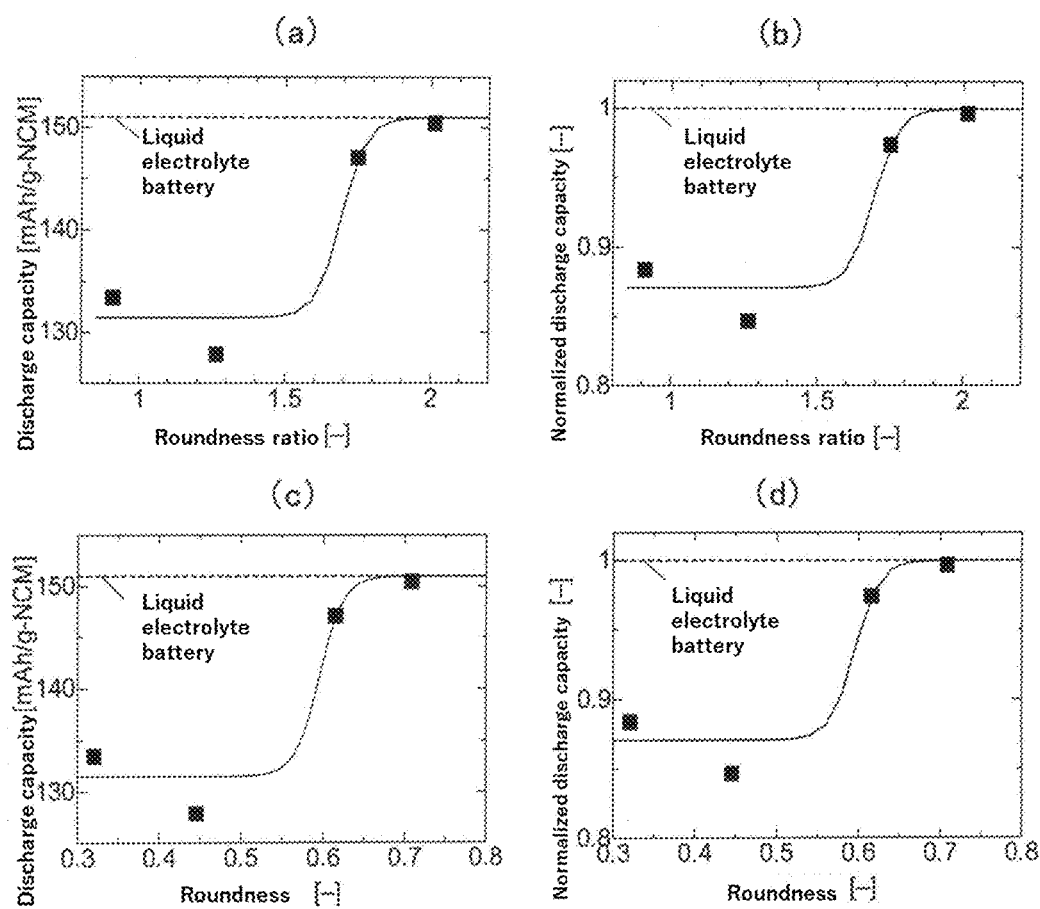
FIG. 18 is a view illustrating the relationship between the average roundness ratio and the first discharge capacity or normalized discharge capacity, and the relationship between the average roundness and the first discharge capacity or normalized discharge capacity of all-solid-state secondary batteries of Example 4 and Comparative Examples 4a and 4b.

From FIGS. 18(a) and (b), it was found that when the average roundness ratio was 1.3 times or more, the first discharge capacity and the normalized discharge capacity increased compared to the average roundness ratio of less than 1.3 times.

From FIGS. 18(c) and (d), it was found that when the average roundness was 0.5 or higher, the first discharge capacity and the normalized discharge capacity increased compared to the average roundness of less than 0.5.

The all-solid-state secondary battery of Example 3 had a first discharge capacity equivalent to that of the liquid electrolyte battery. Because all-solid-state secondary batteries do not contain liquid electrolytes and thus are safer than liquid electrolyte batteries, the present invention is useful in applications in which high safety is required (such as transportation applications such as airplanes and vehicles.

Example 5 and Comparative Example 5

In Example 5, a composite positive electrode active material obtained in the same manner as in Example 1c was used for preparation of a positive electrode. The positive electrode was prepared according to the following procedure.

First, 100 parts by mass of the composite positive electrode active material, 3 parts by mass of acetylene black and 3 parts by mass of styrene-butadiene-styrene block copolymer (SBS) were dispersed in a dispersion medium methoxybenzene so that the solid concentration was 65% by mass or more, thereby obtaining a slurry. The obtained slurry was applied and dried on a collector, an aluminum foil, thereby obtaining a sheet-shaped positive electrode.

Meanwhile in Comparative Example 5, a sheet-shaped positive electrode was obtained in the same manner as in Example 5 except that $LiNbO_3$-coated NCM used in Example 1c and $Li_3PS_4$ prepared to have a median diameter $D_{50}$ of 3.5 μm were used at the same mass ratio as in Example 5 for preparation of the positive electrode without compositing thereof.

The obtained positive electrode, an electrolyte layer and a negative electrode were sandwiched between a pair of collectors and pressed at 360 MPa for 1 minute to obtain an all-solid-state secondary battery. The electrolyte layer used was obtained by pressing 80 mg of $Li_3PS_4$ ($75Li_2S$-$25P_2S_5$, manufactured by Admatechs) at 360 MPa for 1 minute and had a diameter of 10 mm and a thickness of 0.5 mm. The negative electrode used was a lithium-indium foil.

Figure 19:
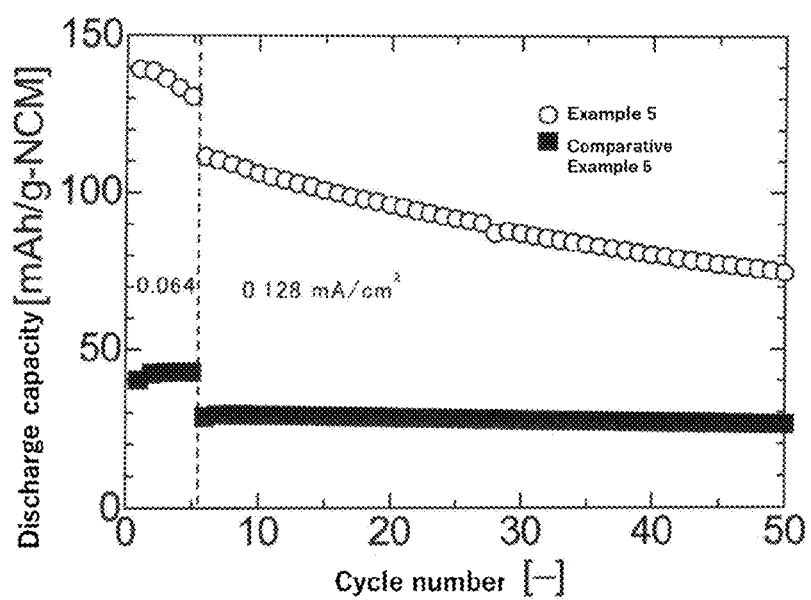
FIG. 19 is a view illustrating the results of the constant current charge and discharge test of all-solid-state secondary batteries of Example 5 and Comparative Example 5.

The all-solid-state secondary batteries were subjected to the constant current charge and discharge test. The final voltages during the test was 3.7 V at the time of charging and 2.0 V at the time of discharging (corresponding to 4.3 V at the time of charging and 2.6 V at the time of discharging in terms of the voltage based on $Li/Li^+$). The current density was 0.064 $mA/cm^2$ up to 5 charge-discharge cycles and 0.128 $mA/cm^2$ thereafter. FIG. 19 illustrates the results. In the Figure, the upper plots correspond to Example 5 and the lower plots correspond to Comparative Example 5. From FIG. 19, it was found that Example 5 had higher discharge capacity than Comparative Example 5 even after charge-discharge cycles. The first discharge capacity of Example 5 was 138.9 mAh/g and that of Comparative Example 5 was 39.9 mAh/g.

(Method for Measuring the Average Roundness of Particles)

The average roundness of particles was measured according to the following method.

Figure 20:
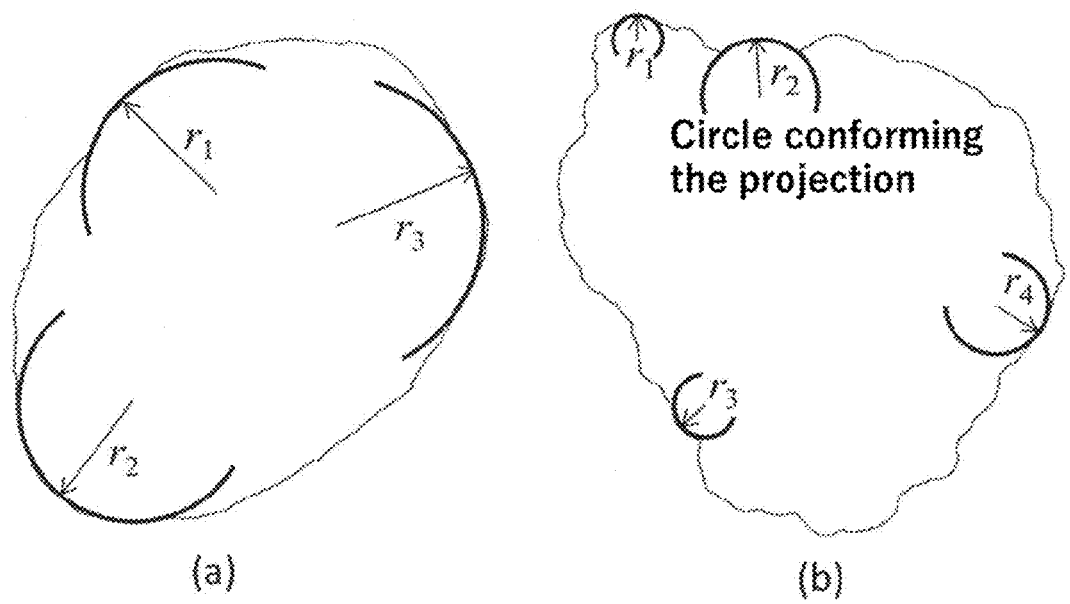
FIG. 20 is a view illustrating a method for measuring the roundness.

The roundness approaches 1 when particles have smooth surfaces as illustrated in FIG. 20(*a*). Meanwhile, particles having rough surfaces as illustrated in FIG. 20(*b*) have a roundness close to zero. The average roundness is defined by formula (1) recited in claim 1. The curvature radii ($r_1, r_2 \ldots r_n$ in the following formula (2)) and the circle equivalent radius ($r_A$ in the following formula (1)) used for calculation of the average roundness were determined according to the following method. Namely, particles were magnified and observed under an electron microscope and the observed image is taken at a resolution of 1280 pixels× 890 pixels. The observation magnification is set so that 1 pixel of the observed image is a scale of 0.01 μm. The obtained image is binarized with an universal image analysis software (such as an open source software, ImageJ) to obtain a binary image. For binarization, the region where particles exist is converted to black and the region where particles do not exist is converted to white. By using an universal image analysis software, the circle equivalent radius of a particle is determined based on the binary image.

Among the pixels that form the binary image, the location of an arbitrary pixel is defined to be (x, y) and thus the pixels in the binary image define color function $\Phi(x, y)$. The black pixel is $\Phi(x, y)=1.0$ and the white pixel is $\Phi(x, y)=0.0$. The obtained $\Phi(x, y)$ is then subjected to smoothing described in Yabe and Wang, "Unified numerical procedure for compressible and Incompressible fluid", Journal of the Physical Society of Japan, Vol. 60 (1991) pp. 2105-2108. The smoothing is carried out for 500 times. Based on the smoothed $\Phi(x, y)$, calculation is carried out according to the following formula (3) to calculate the curvature k(x, y) of the surface of particles. The calculation according to the following formula refers to Blackbill et al., A continuum model for modeling surface tension. J. Comput. Phys., 100 (1992), 335. k(x, y) that fulfils k(x, y)>(0,0) corresponding to a projection at the surface of a particle is only taken out, the inverse thereof is calculated and finally the curvature radii $r_1, r_2 \ldots r_n$ at the projection of the surface of the particle are determined. By using the curvature radii, the roundness $R_j$ of the focused particle is finally determined. The same calculation is carried out for 50 particles and the average thereof serves as the average roundness $R_{ave}$.

[Expression 2]

$$\text{Average roundness } R_{ave} = \frac{1}{N_p}\sum_{j=1}^{N_p} R_j \quad (1)$$

$$R_j = \text{median}\left(\frac{r_1}{r_A}, \frac{r_2}{r_A} \ldots \frac{r_n}{r_A}\right) \quad (2)$$

$$\kappa(x, y) = \frac{1}{|\vec{n}|}\left\{\frac{\vec{n}}{|\vec{n}|} \cdot \nabla |\vec{n}| - (\nabla \cdot \vec{n})\right\} \quad (3)$$

$$\vec{n} = \nabla \phi(x, y) \quad (4)$$

(Product of "the contact ratio of the positive electrode active material and the solid electrolyte" and "the area occupancy ratio of the positive electrode active material")

The product of "the contact ratio of the positive electrode active material and the solid electrolyte" and "the area occupancy ratio of the positive electrode active material" (hereinafter merely referred to as contact ratio×area occupancy ratio) means the value obtained by multiplying the percentage of the length of the interface at which the positive electrode active material contacts the solid electrolyte layer in the cross-sectional image of the positive electrode relative to the length of the interface of the positive electrode active material by the area occupancy ratio of the positive electrode active material. The magnitude of the contact ratio×area occupancy ratio closely relates to the magnitude of the charge/discharge capacity and the magnitude of the number of charge-discharge cycles of the all-solid-state secondary battery. The method for calculating the contact ratio×area occupancy ratio is hereinafter described.

Figure 12:
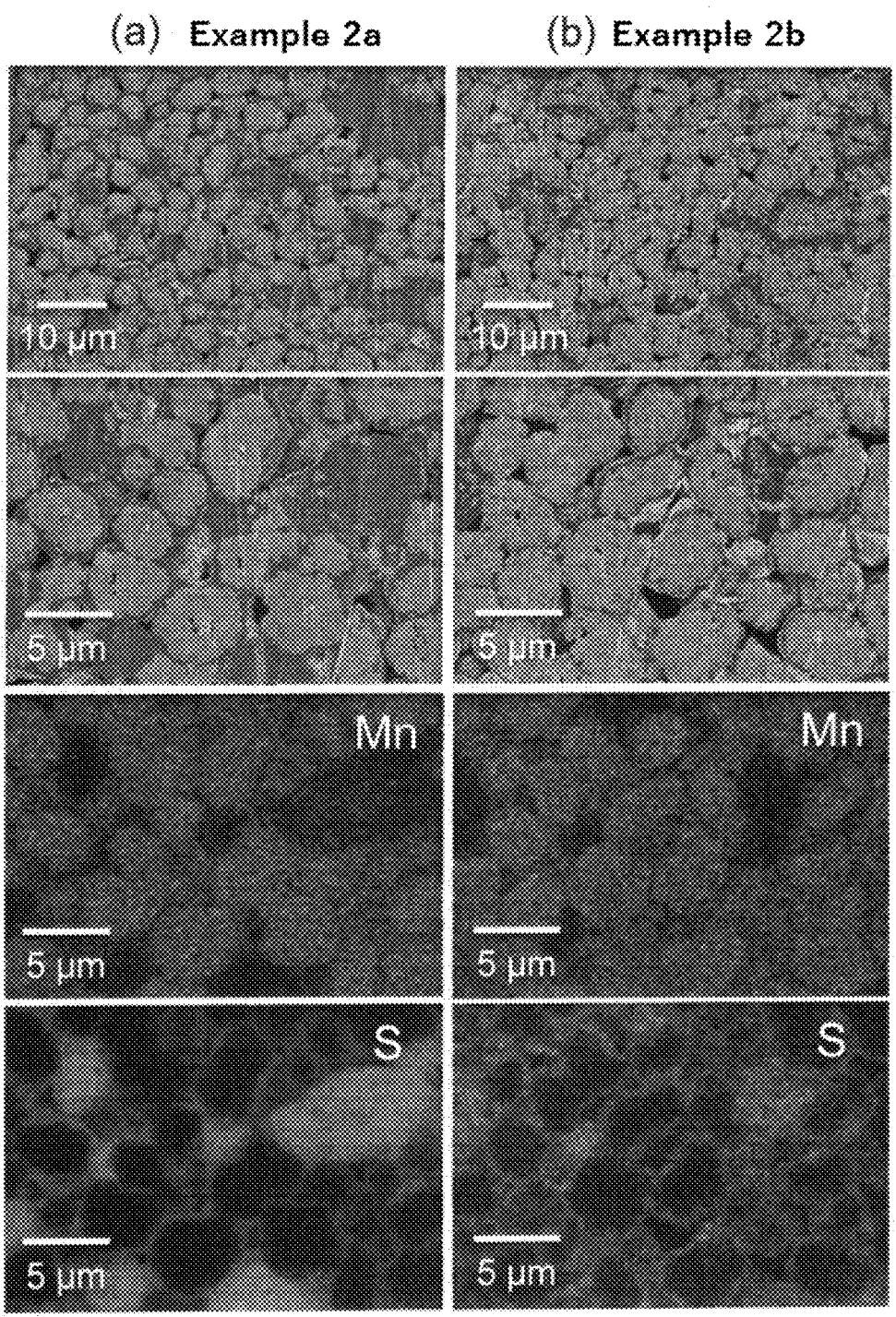
FIG. 12 is a view illustrating appearance of the cross-sections of positive electrodes of Examples 2a and 2b.
Figure 13:
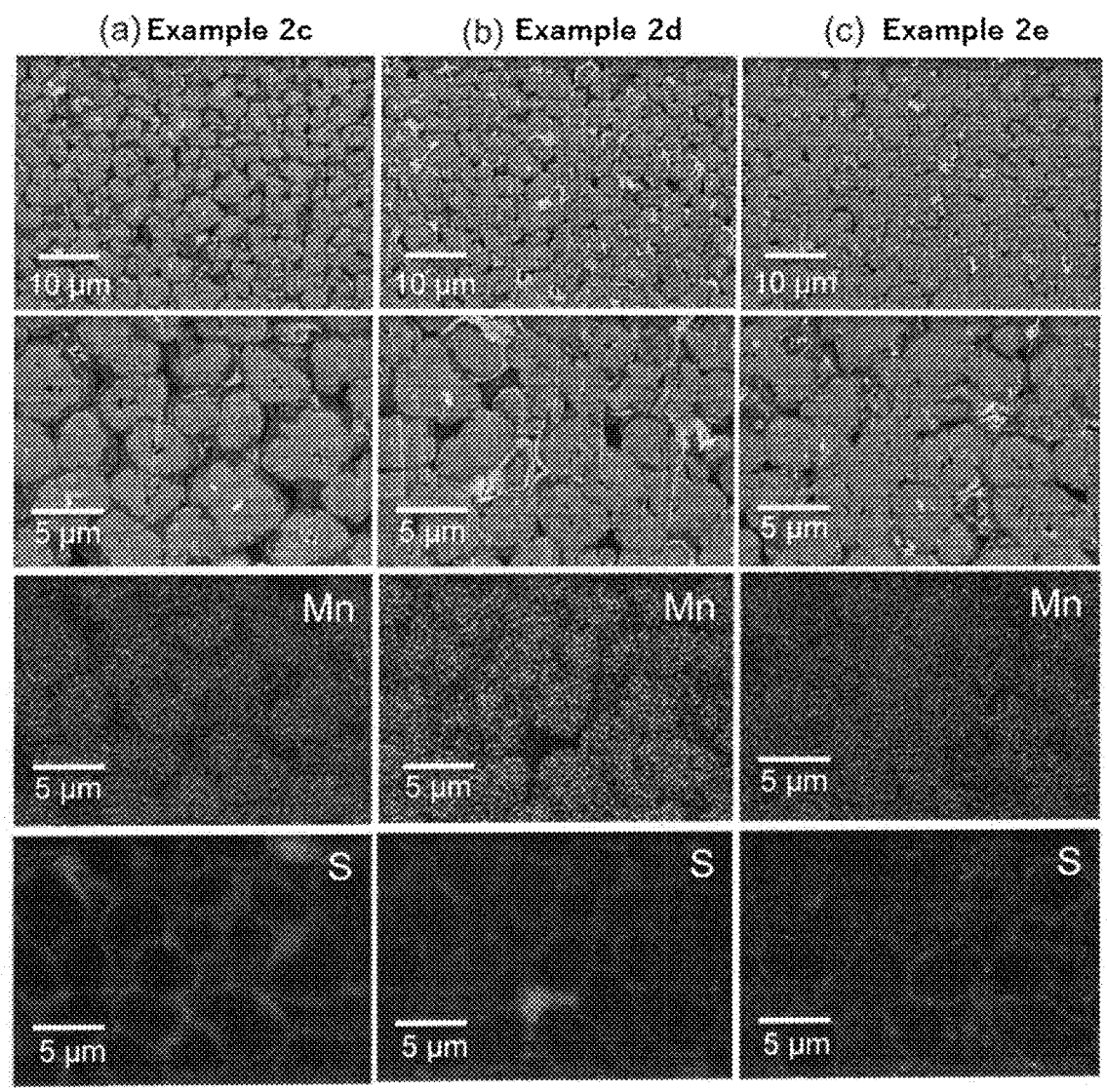
FIG. 13 is a view illustrating appearance of the cross-sections of positive electrodes of Examples 2c to 2e.

As illustrated in electron micrographs in FIGS. 12 to 14, the cross-section of the positive electrode may be colored so that the positive electrode active material is light gray, the solid electrolyte layer is dark gray and a gap is black. The contact ratio is calculated by utilizing the color difference.

Figure 21:
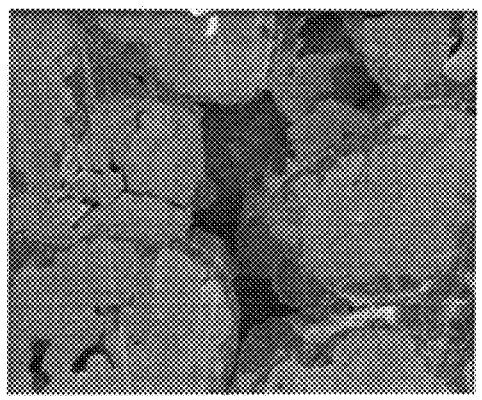
FIG. 21 is a view illustrating a method for measuring the contact ratio between a positive electrode active material and a solid electrolyte.
Figure 21:
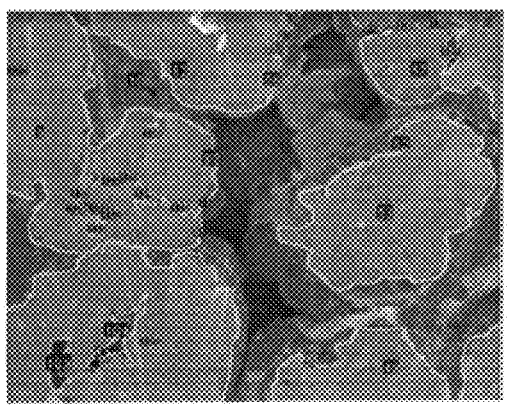
Figure 21:
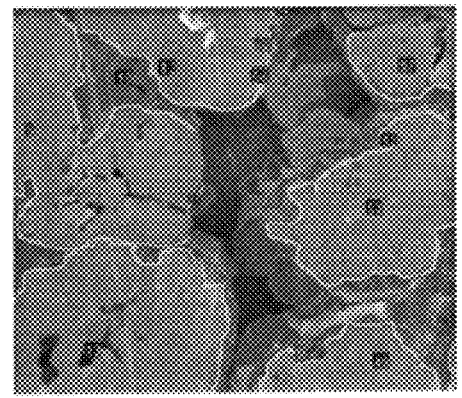

A photo of an arbitrary cross-sectional region of the positive electrode is taken at a magnification of 5000-fold and a field of view of 1280×980 pixels and 25 μm×19 μm. An example of the photo taken is shown in FIG. 21(*a*). The photo is a partial magnification of FIG. 13(*a*). In this photo, the interface of the light gray positive electrode active material is visually identified and a line is drawn at the interface. An example of the photo on which lines are drawn is shown in FIG. 21(*b*). The length of the lines at the interfaces is measured. This length is referred to as the length A (μm) of the interface of the positive electrode active material. Next, the interface at which the dark gray solid electrolyte layer contacts the light gray positive electrode active material in FIG. 21(a) is visually identified and a line is drawn at the interface. An example of the photo on which lines are drawn is shown in FIG. 21(c). The length of the lines at the interfaces is measured. The length is referred to as the length B (μm) of the interface at which the positive electrode active material contacts the solid electrolyte layer. The lengths A and B are measured with a general image analysis software (such as an open source software, Image J).

Then, from FIG. 21(b), the area occupancy ratio C of the positive electrode active material is calculated with the general image analysis software when the whole area of the observed view is regarded as "1".

The contact ratio×area occupancy ratio is calculated according to the following formula.

Contact ratio×area occupancy ratio=$B/A$×100×$C$

The contact ratio×area occupancy ratio of the positive electrodes of Examples 2c and 2d and Comparative Example 2 calculated as above is indicated in Table 7.

TABLE 7

| Composite positive electrode active material | Contact ratio × area occupancy ratio [%] |
| --- | --- |
| Example 2c | 52.0 |
| Example 2d | 49.8 |
| Comparative Example 2 | 37.4 |

From Table 7, it is confirmed that the composite positive electrode active materials of Examples containing the solid electrolyte layers existing thinly and uniformly on the positive electrode active materials have the values of the contact ratio×area occupancy ratio between the solid electrolyte layers and the positive electrode active materials in the positive electrodes that are higher than those of the composite positive electrode active materials of Comparative Examples containing solid electrolyte layers that do not uniformly existing between positive electrode active materials.

What is claimed is:

1. A composite positive electrode active material for an all-solid-state secondary battery containing particles of a positive electrode active material and a sulfide-based solid electrolyte layer coating surfaces of the particles, wherein the composite positive electrode active material has an average roundness $R_{ave}$ that is 1.3 times or more of that of a positive electrode active material at an inner core of the composite positive electrode active material, wherein the average roundness $R_{ave}$ is defined by following formulae (1) and (2):

[Expression 1]

$$\text{Average roundness } R_{ave} = \frac{1}{N_p}\sum_{j=1}^{N_p} R_j \quad (1)$$

$$R_j = \text{median}\left(\frac{r_1}{r_A}, \frac{r_2}{r_A} \ldots \frac{r_n}{r_A}\right) \quad (2)$$

wherein $N_p$ is the number of measured particles; $R_j$ is the roundness of individual particle; median() is the median of the numerical values in the brackets; $r_1$, $r_2 \ldots r_n$ are respectively the curvature radius of each projection in a two-dimensional projected figure of a particle measured; n is the total number of the projections of which curvature radii are measured; and $r_A$ is the circle equivalent radius of a particle measured.

2. The composite positive electrode active material according to claim 1, wherein the composite positive electrode active material has an average roundness of 0.3 to 1.0 and the positive electrode active material at the inner core of the composite positive electrode active material has an average roundness of 0.1 to 0.5.

3. The composite positive electrode active material according to claim 1, wherein a median diameter ratio obtained by dividing a median diameter of the composite positive electrode active material by a median diameter of the positive electrode active material at the inner core is 0.8 to 1.3, and a coefficient of variation ratio obtained by dividing a coefficient of variation of the particle diameter distribution of the composite positive electrode active material by the coefficient of variation of the particle diameter distribution of the positive electrode active material at the inner core is 0.5 to 2.0.

4. The composite positive electrode active material according to claim 1, wherein the composite positive electrode active material contains the positive electrode active material and the solid electrolyte layer at a proportion of 100:1 to 50 (mass ratio).

5. The composite positive electrode active material according to claim 1, wherein the positive electrode active material has a median diameter of 0.1 to 100 μm.

6. The composite positive electrode active material according to claim 1, wherein the solid electrolyte layer coats 50% or more of the surface of the positive electrode active material.

7. The composite positive electrode active material according to claim 1, wherein the positive electrode active material is a substance capable of inserting and extracting a metal ion according to charge and discharge of the all-solid-state secondary battery.

8. The composite positive electrode active material according to claim 7, wherein the positive electrode active material is selected from
  (i) an alkali metal which is Li or Na;
  (ii) a compound containing a metal selected from Li, Na, Mg, In, Cu and Mn and an element selected from Sn, Si, Al, Ge, Sb and P;
  (iii) an oxide, nitride or phosphate containing Li or Na and an element selected from Co, Ni, Mn, Al, Mg, Co, Fe, Zn, Ti, V and Si;
  (iv) an oxide or sulfide of a metal selected from V, Mo, Ti and Fe; and
  (v) graphite and hard carbon, and
  the solid electrolyte layer is selected from an electrolyte layer represented by a lithium-based solid electrolyte of $Li_{4+x}Ge_{1+x}P_xS_4$, $Li_2S$—$GeS_2$, $Li_7P_3S_{11}$, $Li_6PS_5Cl$, $Li_{3.833}Sn_{0.833}As_{0.166}S_4$, $Li_{10}SnP_2S_{12}$, $Li_2S$—$SiS_2$—$Li_3N$, $Li_{9.54}Sn_{1.74}P_{1.44}S_{11.7}Cl_{0.3}$, $Li_2S$—$SiS_2$, $LiI$—$Li_2S$—$SiS_2$, $Li_2S$—$SiS_2$—$Li_xMO_y$ (M is Si, P, Ge, B, Al, Ga or In), $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and $Li_2S$—$P_2S_5$; a sodium-based solid electrolyte of $Na_3PS_4$, $Na_2S$—$GeS_2$—$Ga_2S_3$, $Na_2S$—$GeS_2$, $Na_3Zr_2Si_2PO_{12}$, $Na_2S$—$SiS_2$, $NaI$—$Na_2S$—$SiS_2$, $NaI$—$Na_2S$—$P_2S_5$, $NaI$—$Na_2S$—$B_2S_3$, $Na_3PO_4$—$Na_2S$—$Si_2S$, $Na_3PO_4$—$Na_2S$—$SiS_2$, $NaPO_4$—$Na_2S$—$SiS$, $NaI$—$Na_2S$—$P_2O_5$, $NaI$—$Na_3PO_4$—$P_2S_5$ and $Na_2S$—$P_2S_5$.

9. The composite positive electrode active material according to claim 8, wherein the positive electrode active material is selected from Li, LiM (M is Sn, Si, Al, Ge, Sb or P), $Mg_xM$ (M is Sn, Ge or Sb), $M_ySb$ (M is In, Cu or Mn), $LiCoO_2$, $LiNiO_2$, $LiMn_2O_4$, $Li_{0.44}MnO_2$, $LiNi_{0.5}Mn_{0.5}O_2$, $LiCo_{1/3}Ni_{1/3}Mn_{1/3}O_2$, $Li_{1+x}Mn_{2-x-y}M_yO_4$ (M is one or more metal elements selected from Al, Mg, Co, Fe, Ni and Zn), $Li_xTiO_y$, $Li_xSi_yO_z$, $LiFeO_2$, $LiCoN$, $LiMPO_4$ (M is Fe, Mn, Co or Ni), $Li_3V_2(PO_4)_3$, $V_2O_5$, $MoO_3$, $TiS_2$, FeS, graphite and hard carbon, using lithium as a metal ion, Na, NaM (M is Sn, Si, Al, Ge, Sb or P), $Mg_xM$ (M is Sn, Ge or Sb), $M_ySb$ (M is In, Cu or Mn), $NaCoO_2$, $NaNiO_2$, $NaMn_2O_4$, $Na_{0.44}MnO_2$, $NaNi_{0.5}Mn_{0.5}O_2$, $NaCo_{1/3}Ni_{1/3}Mn_{1/3}O_2$, $Na_{1+x}Mn_{2-x-y}M_yO_4$ (M is one or more metal elements selected from Al, Mg, Co, Fe, Ni and Zn), $Na_xTiO_y$, $Na_xSi_yO_z$, $NaFeO_2$, NaCoN, $NaMPO_4$ (M is Fe, Mn, Co or Ni), $Na_3V_2(PO_4)_3$, $V_2O_5$, $MoO_3$, $TiS_2$, FeS, and graphite and hard carbon, using sodium as a metal ion.

10. A positive electrode for an all-solid-state secondary battery, formed with a composite positive electrode active material containing particles of a positive electrode active material and a sulfide-based solid electrolyte layer coating surfaces of the particles, wherein a value obtained by multiplying a contact ratio calculated from a cross-sectional image of the positive electrode by an area occupancy ratio is 40% or more,
wherein the contact ratio is a percentage of the length of an interface at which the positive electrode active material contacts the solid electrolyte layer relative to the length of an interface of the positive electrode active material; and the area occupancy ratio is an area occupancy ratio of the positive electrode active material; wherein the composite positive electrode active material has an average roundness $R_{ave}$ that is 1.3 times or more of that of a positive electrode active material at an inner core of the composite positive electrode active material, wherein the average roundness $R_{ave}$ is defined by following formulae (1) and (2):

$$\text{Average roundness } R_{ave} = \frac{1}{N_p}\sum_{j=1}^{N_p} R_j \quad (1)$$

$$R_j = \text{median}\left(\frac{r_1}{r_A}, \frac{r_2}{r_A} \ldots \frac{r_n}{r_A}\right) \quad (2)$$

wherein Np is the number of measured particles; $R_j$ is the roundness of individual particle; median() is the median of the numerical values in the brackets; $r_1, r_2 \ldots r_n$ are respectively the curvature radius of each projection in a two-dimensional projected figure of a particle measured; n is the total number of the projections of which curvature radii are measured; and $r_A$ is the circle equivalent radius of a particle measured.

11. An all-solid-state secondary battery comprising the positive electrode according to claim 10, a negative electrode and a solid electrolyte layer positioned between the positive electrode and the negative electrode.

12. A method for producing the composite positive electrode active material according to claim 1, comprising the step of subjecting particles of the positive electrode active material and a sulfide-based solid electrolyte to a dry particle blending process in an inert gas atmosphere having a low water content, the dry particle blending process being selected from a high-speed impact system, a compression shear system, an impact compression shear system and a mixing shear friction system.

* * * * *